US011402707B2

United States Patent
Yasui et al.

(10) Patent No.: US 11,402,707 B2
(45) Date of Patent: Aug. 2, 2022

(54) LIQUID CRYSTAL DISPLAY DEVICE COMPRISING A FIRST LIQUID CRYSTAL LAYER HAVING POSITIVE DIELECTRIC ANISOTROPY AND A SECOND LIQUID CRSYTAL LAYER HAVING NEGATIVE DIELECTRIC ANISOTROPY

(71) Applicants: Panasonic Liquid Crystal Display Co., Ltd., Himeji (JP); Pasona Knowledge Partner Inc., Osaka (JP)

(72) Inventors: Yoichi Yasui, Osaka (JP); Takao Imaoku, Hyogo (JP); Katsuhiro Kikuchi, Osaka (JP); Kazuhiko Tsuda, Hyogo (JP)

(73) Assignees: PANASONIC LIQUID CRYSTAL DISPLAY CO., LTD., Hyogo (JP); PASONA KNOWLEDGE PARTNER INC., Osaka (JP)

( * ) Notice: Subject to any disclaimer, the term of this patent is extended or adjusted under 35 U.S.C. 154(b) by 365 days.

(21) Appl. No.: 16/402,017

(22) Filed: May 2, 2019

(65) Prior Publication Data
US 2019/0258101 A1 Aug. 22, 2019

Related U.S. Application Data

(63) Continuation of application No. PCT/JP2016/004953, filed on Nov. 24, 2016.

(51) Int. Cl.
*G02F 1/1347* (2006.01)
*G02F 1/1335* (2006.01)
*G02F 1/13363* (2006.01)
*G02F 1/1343* (2006.01)
(Continued)

(52) U.S. Cl.
CPC ............ *G02F 1/1347* (2013.01); *G02F 1/137* (2013.01); *G02F 1/1368* (2013.01);
(Continued)

(58) Field of Classification Search
CPC ............. G02F 1/13706; G02F 1/13712; G02F 1/133567; G02F 1/13471
See application file for complete search history.

(56) References Cited

U.S. PATENT DOCUMENTS

2008/0272375 A1 * 11/2008 Oh .......................... H01L 27/12
257/72
2013/0093968 A1 4/2013 Yanai
(Continued)

FOREIGN PATENT DOCUMENTS

CN 103069332 4/2013
JP 2007-310161 11/2007
(Continued)

OTHER PUBLICATIONS

International Search Report dated Feb. 14, 2017 for PCT/JP2016/004953, 4 pages.
(Continued)

*Primary Examiner* — Paul C Lee
(74) *Attorney, Agent, or Firm* — Hamre, Schumann, Mueller & Larson, P.C.

(57) ABSTRACT

A liquid crystal display device includes: a first liquid crystal cell; a second liquid crystal cell disposed in a backlight side; and a first optical sheet and a second optical sheet both having an identical layer structure. The first optical sheet is disposed on a front surface side of the first liquid crystal cell and the second optical sheet is disposed on a back surface side of the second liquid crystal cell, or vice versa.

8 Claims, 12 Drawing Sheets

(51) Int. Cl.
*G02F 1/1368* (2006.01)
*G02F 1/137* (2006.01)

(52) U.S. Cl.
CPC .... *G02F 1/13363* (2013.01); *G02F 1/133504* (2013.01); *G02F 1/133528* (2013.01); *G02F 1/134309* (2013.01); *G02F 1/13706* (2021.01); *G02F 1/13712* (2021.01); *G02F 1/133512* (2013.01); *G02F 1/133514* (2013.01); *G02F 1/133562* (2021.01); *G02F 1/133567* (2021.01); *G09G 2300/023* (2013.01)

(56) References Cited

U.S. PATENT DOCUMENTS

2013/0106675 A1* 5/2013 Mitobe .................. G02B 30/25
345/32

2015/0129877 A1* 5/2015 Cho .................. G02F 1/134309
257/59

FOREIGN PATENT DOCUMENTS

| | | | |
|---|---|---|---|
| JP | 2008-191269 | | 8/2008 |
| JP | 2008191269 A | * | 8/2008 |
| JP | 2010-97118 | | 4/2010 |
| JP | 2010097118 A | * | 4/2010 |
| JP | 2011-197590 | | 6/2011 |
| JP | 2011197590 A | * | 10/2011 |
| WO | WO-2018096569 A1 | * | 5/2018 ....... G02F 1/133504 |

OTHER PUBLICATIONS

Office Action issued for Chinese Patent Application No. 201680090977.4, dated Aug. 4, 2021, 20 pages including machine translation.

* cited by examiner

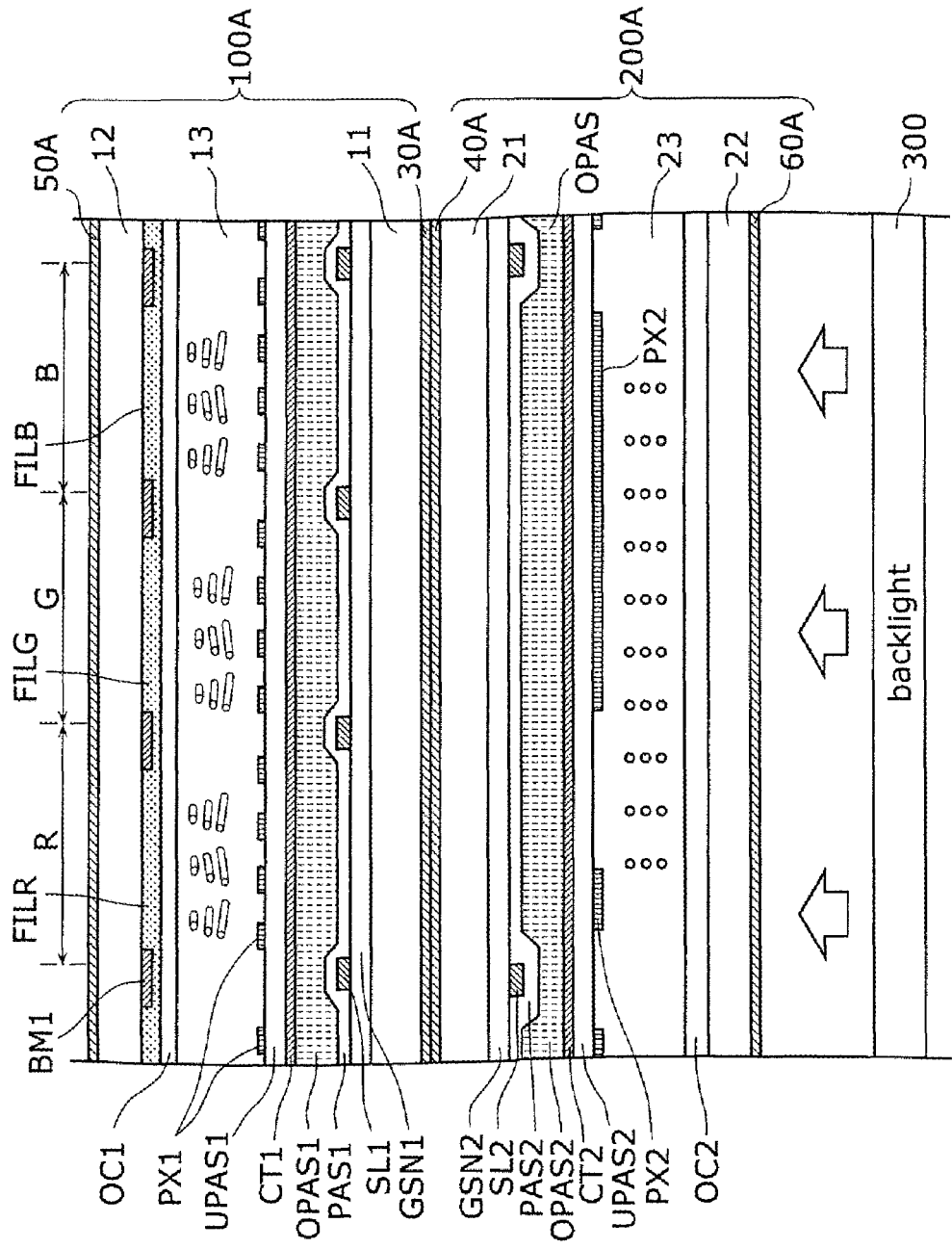

LIQUID CRYSTAL DISPLAY DEVICE COMPRISING A FIRST LIQUID CRYSTAL LAYER HAVING POSITIVE DIELECTRIC ANISOTROPY AND A SECOND LIQUID CRSYTAL LAYER HAVING NEGATIVE DIELECTRIC ANISOTROPY

CROSS-REFERENCE TO RELATED APPLICATION

This application is a bypass continuation of international patent application PCT/JP2016/004953, filed: Nov. 24, 2016 designating the United States of America, the entire disclosure of which is incorporated herein by reference.

TECHNICAL FIELD

The present invention relates to a liquid crystal display device.

BACKGROUND

A liquid crystal display device is used as a display of a television, a monitor or the like. However, the liquid crystal display device has a contrast ratio lower than an organic electro luminescence (EL) display device.

A technique, in which two display panels overlap each other and an image is displayed on each display panel, is conventionally proposed as a technique of improving a contrast ratio of a liquid crystal display device (for example, see Unexamined Japanese Patent Publication No. 2007-310161). A color image is displayed on a front-side (observer-side) display panel in two display panels disposed back and forth, and a black-and-white image is displayed on a rear-side (backlight-side) display panel, thereby improving the contrast ratio.

SUMMARY

As described above, in a liquid crystal display device in which the plurality of display panels are superimposed on each other, there is a demand for a higher image quality and a higher contrast ratio. For example, a contrast ratio of about 1000000:1 is required.

The present disclosure provides a liquid crystal display device capable of displaying an image with a high contrast ratio and high image quality in a liquid crystal display device in which the plurality of display panels are superimposed on each other.

A liquid crystal display device according to the present disclosure includes: a first liquid crystal cell; a second liquid crystal cell disposed at a position farther from an observer than the first liquid crystal cell; and a first optical sheet and a second optical sheet each of which is an optical sheet in which a polarizing plate and a retardation plate are laminated, the first optical sheet and the second optical sheet being an identical component. Each of the first liquid crystal cell and the second liquid crystal cell includes a front surface that is a surface on an observer side and a back surface opposed to the front surface, and the first optical sheet is disposed on a front surface side of the first liquid crystal cell and the second optical sheet is disposed on a back surface side of the second liquid crystal cell, or the first optical sheet is disposed on the back surface side of the first liquid crystal cell and the second optical sheet is disposed on the front surface side of the second liquid crystal cell.

A liquid crystal display device according to another present disclosure includes: a first liquid crystal cell; and a second liquid crystal cell disposed at a position farther from an observer than the first liquid crystal cell, wherein each of the first liquid crystal cell and the second liquid crystal cell includes a front surface that is a surface on an observer side and a back surface opposed to the front surface, the first liquid crystal cell includes a first TFT substrate including a pixel electrode and a common electrode that are opposed to each other and a first counter substrate opposed to the first TFT substrate, the first counter substrate including a color filter and a black matrix surrounding the color filter, the second liquid crystal cell includes a second TFT substrate including a pixel electrode and a common electrode that are opposed to each other and a second counter substrate opposed to the second TFT substrate, the second counter substrate including a black matrix, the first counter substrate of the first liquid crystal cell is disposed closer to the front surface of the first liquid crystal cell than the first TFT substrate, and the second counter substrate of the second liquid crystal cell is disposed closer to the back surface of the second liquid crystal cell than the second TFT substrate.

A liquid crystal display device according to another present disclosure includes: a first liquid crystal cell; and a second liquid crystal cell disposed at a position farther from an observer than the first liquid crystal cell, wherein each of the first liquid crystal cell and the second liquid crystal cell includes a front surface that is a surface on an observer side and a back surface opposed to the front surface, the first liquid crystal cell includes a first TFT substrate including a pixel electrode and a common electrode that are opposed to each other, a first counter substrate opposed to the first TFT substrate, the first counter substrate including a color filter and a black matrix surrounding the color filter, and a first liquid crystal layer disposed between the first TFT substrate and the first counter substrate, the second liquid crystal cell includes a second TFT substrate including a pixel electrode and a common electrode that are opposed to each other, a second counter substrate opposed to the second TFT substrate, the second counter substrate including a black matrix, and a second liquid crystal layer disposed between the second TFT substrate and the second counter substrate, the first liquid crystal layer includes positive type liquid crystal having positive dielectric anisotropy, and the second liquid crystal layer includes negative type liquid crystal having negative dielectric anisotropy.

BRIEF DESCRIPTION OF DRAWINGS

FIG. 14 is a sectional view illustrating a liquid crystal display device according to a modification of the second exemplary embodiment taken along line XIV-XIV in FIGS. 12A and 12B.

DETAILED DESCRIPTION

The following describes an exemplary embodiment of the present disclosure. The embodiment described below is merely one specific example of the present disclosure. The numerical values, shapes, materials, elements, and arrangement and connection of the elements, etc. indicated in the following embodiment are given merely by way of illustration and are not intended to limit the present disclosure. Therefore, among elements in the following embodiment, those not recited in any one of the independent claims defining the broadest inventive concept of the present disclosure are described as optional elements.

Note that the figures are schematic illustrations and are not necessarily precise depictions. Accordingly, the figures are not necessarily to scale. Moreover, in the figures, elements that are essentially the same share like reference signs. Accordingly, duplicate description is omitted or simplified.

First Exemplary Embodiment

Figure 1:
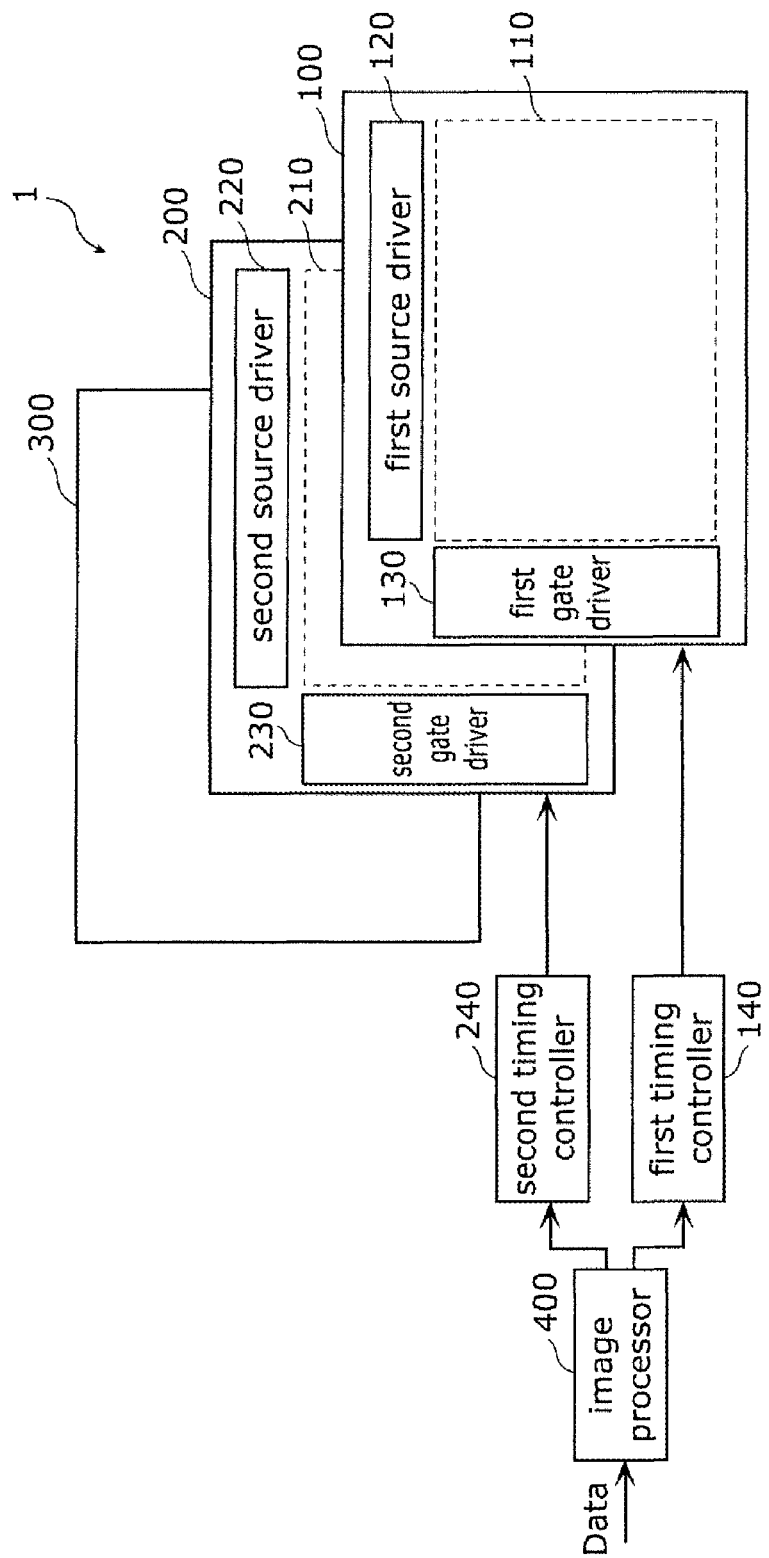
FIG. 1 is a view illustrating a schematic configuration of a liquid crystal display device according to a first exemplary embodiment.

Liquid crystal display device 1 according to a first exemplary embodiment will be described below with reference to FIG. 1. FIG. 1 is a view illustrating a schematic configuration of liquid crystal display device 1 of the first exemplary embodiment.

Liquid crystal display device 1 is an example of an image display device configured by superimposing a plurality of display panels each of which includes a liquid crystal cell, and displays an image (video) of a still image or a moving image.

As illustrated in FIG. 1, liquid crystal display device 1 of the first exemplary embodiment includes first display panel 100 disposed at a position (front side) close to an observer and second display panel 200 disposed at a position (rear side) farther away from the observer than first display panel 100.

Further, liquid crystal display device 1 includes backlight 300 disposed on the rear side of first display panel 100 and second display panel 200. Specifically, backlight 300 is disposed on the rear side of second display panel 200.

First display panel 100 is a main panel that displays an image visually recognized by a user. In the first exemplary embodiment, first display panel 100 displays a color image. First source driver 120 and first gate driver 130 are provided on first display panel 100 in order to display a color image corresponding to an input video signal on first image display region 110.

Second display panel 200 is a sub-panel disposed on a back surface side of first display panel 100. In the first exemplary embodiment, second display panel 200 displays a monochrome image (black and white image) of an image corresponding to the color image displayed on first display panel 100 in synchronization with the color image. Second source driver 220 and second gate driver 230 are provided on second display panel 200 in order to display a monochrome image corresponding to the input video signal on second image display region 210.

First image display region 110 and second image display region 210 include a plurality of pixels arranged in a matrix form. A number of pixels in first image display region 110 and a number of pixels in second image display region 210 may be same as or different from each other, but the number of pixels in first image display region 110 in first display panel 100 which is a main panel is preferably larger than the number of pixels of second image display region 210 in second display panel 200 which is a sub-panel.

For example, driving systems of first display panel 100 and second display panel 200 are a lateral electric field system such as an in-plane switching (IPS) system. However, the driving system is not limited to the lateral electric field system, and may be a vertical alignment (VA) system or a twisted nematic (TN) system.

Backlight 300 emits light toward first display panel 100 and second display panel 200. The backlight 300 is a surface light source that uniformly emits scattered light (diffused light). For example, backlight 300 is a light emitting diode (LED) backlight in which an LED is used as a light source. However, backlight 300 is not limited to the LED backlight. In the first exemplary embodiment, backlight 300 is of a direct under type. However, backlight 300 may be of an edge type. Backlight 300 may include an optical member such as a diffusion plate (diffusion sheet) that diffuses light emitted from the light source.

Liquid crystal display device 1 also includes first timing controller 140 that controls first source driver 120 and first gate driver 130 of first display panel 100, second timing controller 240 that controls second source driver 220 and second gate driver 230 of second display panel 200, and image processor 400 that outputs image data to first timing controller 140 and second timing controller 240.

Image processor 400 receives input video signal Data transmitted from an external system (not illustrated), performs image processing on input video signal Data, outputs first image data DAT1 to first timing controller 140, and outputs second image data DAT2 to second timing controller 240. Image processor 400 also outputs a control signal (not illustrated in FIG. 1) such as a synchronizing signal to first timing controller 140 and second timing controller 240. First image data DAT1 is image data used to display the color image, and second image data DAT2 is image data used to display the monochrome image.

In the first exemplary embodiment, assuming that G1(x) is a function of a γ value of the image data of first display panel 100 that displays the color image and that G2(x) is a function of the γ value of the image data of second display panel 200 that displays the monochrome image, image processor 400 may perform image processing so as to satisfy a relationship of G1(x)>G2(x) in at least one gradation x. Specifically, the relation of G1(x)>G2(x) is satisfied in all gradations. That is, in each gradation, the image processing is performed such that specific transmittance of second display panel 200 is larger than that of first display panel 100, and second display panel 200 (sub-panel) may be controlled so as to have higher gradation than first display panel 100. This image processing can eliminate coloring from an oblique direction.

In liquid crystal display device 1 of the first exemplary embodiment, the image is displayed while two display panels of first display panel 100 and second display panel 200 are superimposed on each other, so that black can be tightened. Consequently, the image having a high contrast ratio can be displayed. For example, liquid crystal display device 1 is a high dynamic range (HDR) compatible television, and a local dimming compatible direct-under type LED backlight may be used as backlight 300. In this case, the color image having the high contrast ratio and high image quality can be displayed.

Although not illustrated, first display panel 100 and second display panel 200 are bonded to each other, and held together with backlight 300 by a holding member (a frame or a chassis) made of metal or resin.

Figure 2:
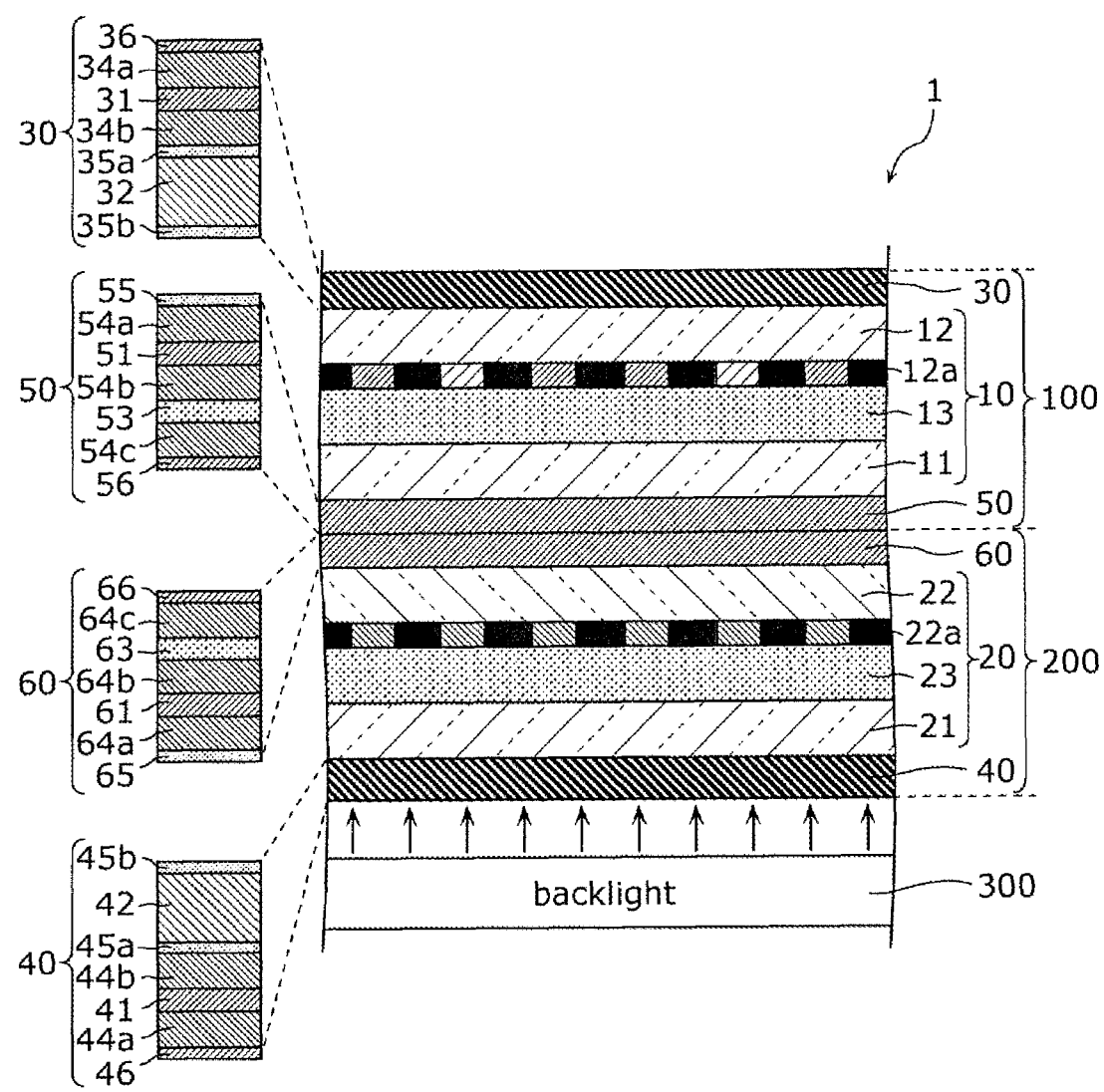
FIG. 2 is a partially enlarged sectional view illustrating the liquid crystal display device of the first exemplary embodiment.

The detailed configuration of liquid crystal display device 1 will be described with reference to FIG. 2. FIG. 2 is a partially enlarged sectional view illustrating liquid crystal display device 1 of the first exemplary embodiment.

As illustrated in FIG. 2, liquid crystal display device 1 includes first liquid crystal cell 10, second liquid crystal cell 20, first optical sheet 30, second optical sheet 40, third optical sheet 50, and fourth optical sheet 60.

First display panel 100 is constructed with first liquid crystal cell 10, first optical sheet 30, and third optical sheet 50. Second display panel 200 is constructed with second liquid crystal cell 20, second optical sheet 40, and fourth optical sheet 60.

First liquid crystal cell 10 of first display panel 100 is disposed at a position (front side) close to an observer. On the other hand, second liquid crystal cell 20 of second display panel 200 is disposed at a position (rear side) farther from the observer than first liquid crystal cell 10. Each of first liquid crystal cell 10 and second liquid crystal cell 20 includes a front surface that is a surface on the observer side and a back surface (rear surface) that turns away from the front surface.

First liquid crystal cell 10 includes first thin film transistor (TFT) substrate 11, first counter substrate 12 opposed to first TFT substrate 11, and first liquid crystal layer 13 disposed between first TFT substrate 11 and first counter substrate 12. In the first exemplary embodiment, first counter substrate 12 is disposed closer to the front surface of first liquid crystal cell 10 than first TFT substrate 11.

First TFT substrate 11 is a substrate in which a TFT layer (not illustrated) is formed on a transparent substrate such as a glass substrate. A TFT and wiring driving the TFT are formed in the TFT layer. A pixel electrode used to apply the voltage to first liquid crystal layer 13 is formed on a planarization layer of the TFT layer. In the first exemplary embodiment, because first display panel 100 is driven by the IPS system, not only a pixel electrode but also a counter electrode are formed on first TFT substrate 11. That is, first TFT substrate 11 includes the pixel electrode and the counter electrode (common electrode) that are opposed to each other. The TFT, the pixel electrode, and the counter electrode are formed in each pixel. An alignment film is formed so as to cover the pixel electrode and the counter electrode.

First counter substrate 12 is a CF substrate in which a color filter layer as first pixel formation layer 12a is formed on a transparent substrate such as a glass substrate. First pixel formation layer 12a includes a black matrix (black portion) and a color filter (colored portion). The black matrix is formed into, for example, a lattice shape or a stripe shape, and a plurality of matrix-shaped openings constituting pixels are formed in the black matrix. A color filter is formed in each opening of the black matrix. That is, the black matrix surrounds the color filter. For example, each color filter is a red color filter, a green color filter, or a blue color filter. The color filters of such colors correspond to respective pixels. An overcoat layer is formed so as to cover first pixel formation layer 12a. An alignment film is formed on the surface of the overcoat layer.

First liquid crystal layer 13 is sealed between first TFT substrate 11 and first counter substrate 12. The liquid crystal material of first liquid crystal layer 13 can appropriately be selected according to the driving system. In this case, as the liquid crystal material of first liquid crystal layer 13, positive type liquid crystal having positive dielectric anisotropy may be used, or negative type liquid crystal having negative dielectric anisotropy may be used.

Second liquid crystal cell 20 includes second TFT substrate 21, second counter substrate 22 opposed to second TFT substrate 21, and second liquid crystal layer 23 disposed between second TFT substrate 21 and second counter substrate 22. In the first exemplary embodiment, second counter substrate 22 is disposed closer to the front surface of second liquid crystal cell 20 than second TFT substrate 21. Alternatively, second counter substrate 22 is disposed closer to the back surface of second liquid crystal cell 20 than second TFT substrate 21.

Second TFT substrate 21 has the same configuration as first TFT substrate 11, and is a substrate in which a TFT layer (not illustrated) is formed on a transparent substrate such as a glass substrate. Because second display panel 200 is driven by the IPS system similarly to first display panel 100, second TFT substrate 21 includes the pixel electrode and the common electrodes that are opposed to each other.

Second counter substrate 22 is a substrate in which second pixel formation layer 22a is formed on the transparent substrate such as a glass substrate. Second pixel formation layer 22a includes the black matrix in which a plurality of matrix-form openings constituting the pixel are formed. An overcoat layer is formed so as to cover second pixel formation layer 22a. An alignment film is formed on the surface of the overcoat layer. In the first exemplary embodiment, second display panel 200 displays the monochrome image, so that the color filter is not formed in second pixel formation layer 22a. Thus, the opening of the black matrix of second pixel formation layer 22a is filled with the overcoat layer.

Second liquid crystal layer 23 is sealed between second TFT substrate 21 and second counter substrate 22. A liquid crystal material of second liquid crystal layer 23 can appropriately be selected according to the driving system. In this case, as the liquid crystal material of second liquid crystal layer 23, positive type liquid crystal having positive dielectric anisotropy may be used, or negative type liquid crystal having negative dielectric anisotropy may be used. The liquid crystal material of second liquid crystal layer 23 may be different from the liquid crystal material of first liquid crystal layer 13 of first liquid crystal cell 10. For example, first liquid crystal layer 13 may include the positive type liquid crystal, and second liquid crystal layer 23 may include the negative type liquid crystal, and vice versa.

First optical sheet 30 is an optical sheet in which polarizing plate 31 and retardation plate 32 are laminated, and includes at least polarizing plate 31 and retardation plate 32 as a laminated film. First optical sheet 30 is a retardation plate-attached polarizing film (retardation plate-attached polarizing plate) in which a plurality of laminated films including polarizing plate 31 and retardation plate 32 are laminated and integrated.

In the first exemplary embodiment, first optical sheet 30 is an optical film further including, as a layer structure, first support member 34a and second support member 34b between which polarizing plate 31 is sandwiched, first adhesive layer 35a and second adhesive layer 35b between which retardation plate 32 is sandwiched, and protective layer 36 provided on first support member 34a as the outermost layer.

In first optical sheet 30, an absorption axis of polarizing plate 31 and a slow axis of retardation plate 32 are configured to be substantially orthogonal to each other. Alternatively, the absorption axis of polarizing plate 31 and the slow axis of retardation plate 32 may not be orthogonal to each other. For example, the absorption axis of polarizing plate 31 and the slow axis of retardation plate 32 may be substantially parallel to each other.

Second optical sheet 40 is an optical sheet in which at least polarizing plate 41 and retardation plate 42 are laminated. Similarly to first optical sheet 30, second optical sheet 40 is a retardation plate-attached polarizing film in which the plurality of laminated films including polarizing plate 41 and retardation plate 42 are laminated and integrated.

In the first exemplary embodiment, second optical sheet 40 is an optical film further including, as a layer structure, first support member 44a and second support member 44b between which polarizing plate 41 is sandwiched, first adhesive layer 45a and second adhesive layer 45b between which retardation plate 42 is sandwiched, and protective layer 46 provided on first support member 44a as the outermost layer.

In second optical sheet 40, similarly to first optical sheet 30, the absorption axis of polarizing plate 41 and the slow axis of retardation plate 42 are configured to be substantially orthogonal to each other. Alternatively, the absorption axis of polarizing plate 41 and the slow axis of retardation plate 42 may not be orthogonal to each other. For example, the absorption axis of polarizing plate 41 and the slow axis of retardation plate 42 may be substantially parallel to each other.

First optical sheet 30 and second optical sheet 40 thus configured are an identical component. That is, first optical sheet 30 and second optical sheet 40 have the same layer structure, and same films (layers) are laminated in the same order in first optical sheet 30 and second optical sheet 40. In this way, first optical sheet 30 and second optical sheet 40 are formed as the same component, which allows the component to be commonly used to reduce cost. First optical sheet 30 and second optical sheet 40 are disposed in opposite directions.

In the first exemplary embodiment, first optical sheet 30 is disposed on the front surface side of first liquid crystal cell 10, and second optical sheet 40 is disposed on the back surface side of second liquid crystal cell 20. In other words, first optical sheet 30 and second optical sheet 40 are disposed so as to be positioned on both outsides of first liquid crystal cell 10 and second liquid crystal cell 20.

Specifically, first optical sheet 30 is bonded to first liquid crystal cell 10 by adhering second adhesive layer 35b of first optical sheet 30 to the front surface of first liquid crystal cell 10. Second optical sheet 40 is bonded to second liquid crystal cell 20 by adhering second adhesive layer 45b of second optical sheet 40 to the back surface of second liquid crystal cell 20.

Third optical sheet 50 is an optical sheet (polarizing film) including at least polarizing plate 51. In the first exemplary embodiment, third optical sheet 50 is constructed with the plurality of laminated films, and further includes light diffusion layer 53, first support member 54a, second support member 54b, and third support member 54c between which polarizing plate 51 and light diffusion layer 53 are sequentially sandwiched, adhesive layer 55 provided on first support member 54a, and protective layer 56 provided on third support member 54c as the outermost layer.

Fourth optical sheet 60 is an optical sheet (polarizing film) including at least polarizing plate 61. In the first exemplary embodiment, fourth optical sheet 60 is constructed with the plurality of laminated films, and further includes light diffusion layer 63, first support member 64a, second support member 64b, and third support member 64c between which polarizing plate 61 and light diffusion layer 63 are sequentially sandwiched, adhesive layer 65 provided on first support member 64a, and protective layer 66 provided on third support member 64c as the outermost layer.

Third optical sheet 50 and fourth optical sheet 60 thus configured are an identical component. That is, third optical sheet 50 and fourth optical sheet 60 have the same layer structure, and same films (layers) are laminated in the same order in third optical sheet 50 and fourth optical sheet 60. In this way, third optical sheet 50 and fourth optical sheet 60 are formed as the same component, which allows the component to be commonly used to reduce the cost. Third optical sheet 50 and fourth optical sheet 60 are disposed in opposite directions.

In the first exemplary embodiment, third optical sheet 50 is disposed on the back surface side of first liquid crystal cell 10, and fourth optical sheet 60 is disposed on the front surface side of second liquid crystal cell 20. That is, third optical sheet 50 and fourth optical sheet 60 are disposed so as to be positioned inside first liquid crystal cell 10 and second liquid crystal cell 20 (between first liquid crystal cell 10 and second liquid crystal cell 20).

Specifically, third optical sheet 50 is bonded to first liquid crystal cell 10 by adhering adhesive layer 55 of third optical sheet 50 to the back surface of first liquid crystal cell 10. Fourth optical sheet 60 is bonded to second liquid crystal cell 20 by adhering adhesive layer 65 of fourth optical sheet 60 to the front surface of second liquid crystal cell 20.

In first display panel 100, first optical sheet 30 and third optical sheet 50 are bonded to first liquid crystal cell 10 such that first liquid crystal cell 10 is sandwiched therebetween. In this case, first optical sheet 30 and third optical sheet 50 are disposed such that the polarization directions of polarizing plate 31 and polarizing plate 51 are orthogonal to each other. In other words, first optical sheet 30 and third optical sheet 50 are disposed such that polarizing plate 31 and polarizing plate 51 have a crossed Nicol positional relationship. In this case, the absorption axes of polarizing plate 31 and polarizing plate 51 are orthogonal to each other.

In second display panel 200, second optical sheet 40 and fourth optical sheet 60 are bonded to second liquid crystal cell 20 such that second liquid crystal cell 20 is sandwiched therebetween. In this case, second optical sheet 40 and fourth optical sheet 60 are disposed such that the polarization directions of polarizing plate 41 and polarizing plate 61 are orthogonal to each other. In other words, second optical sheet 40 and fourth optical sheet 60 are disposed such that polarizing plate 41 and polarizing plate 61 have a crossed Nicol positional relationship. In this case, the absorption axes of polarizing plate 41 and polarizing plate 61 are orthogonal to each other.

It is important that third optical sheet 50 and fourth optical sheet 60 disposed inside first liquid crystal cell 10 and second liquid crystal cell 20 be disposed such that the deflection directions of polarizing plate 51 of third optical sheet 50 and polarizing plate 61 of fourth optical sheet 60 coincide with each other. That is, it is important that the absorption axis of polarizing plate 51 be parallel to the absorption axis of polarizing plate 61.

Figure 3:
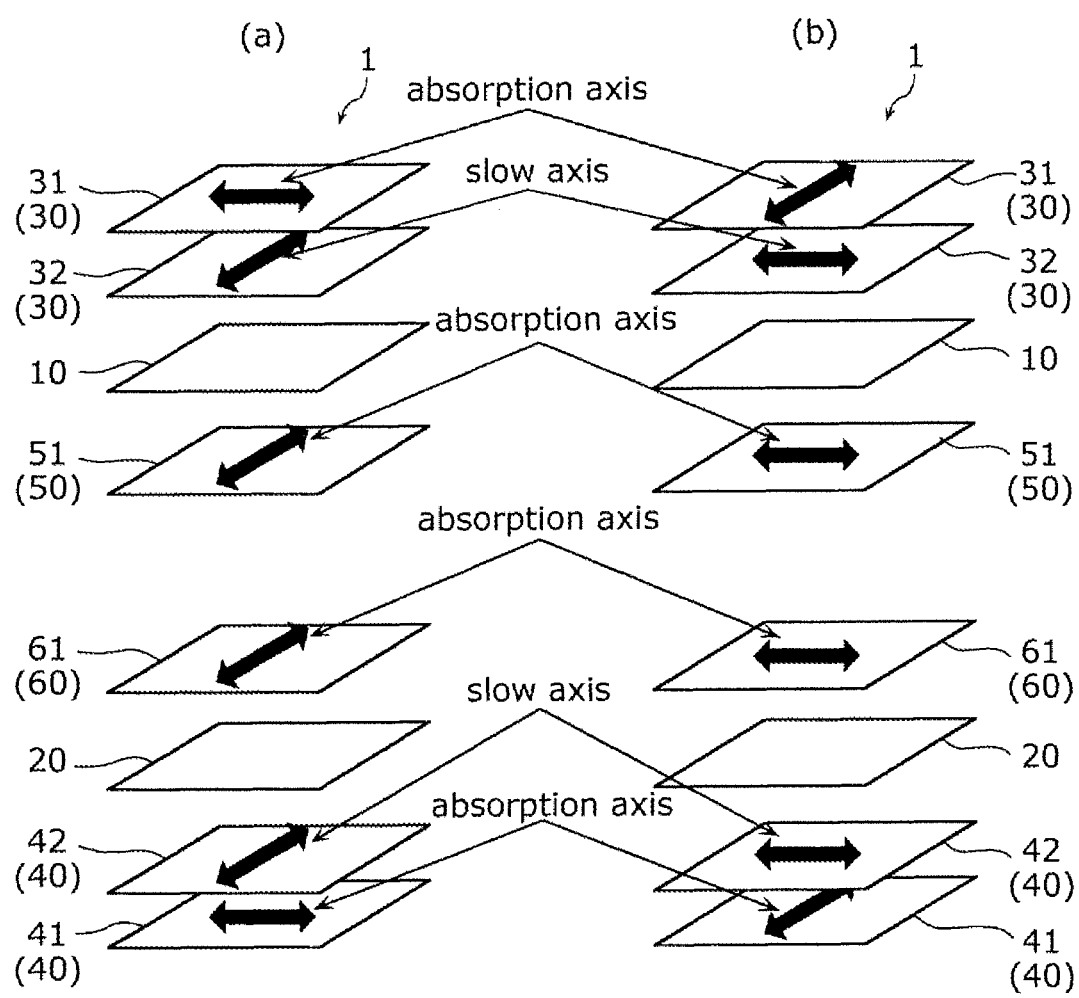
FIG. 3 is a view illustrating an arrangement relationship between a polarizing plate and a retardation plate in the liquid crystal display device of the first exemplary embodiment.

In the first exemplary embodiment, first optical sheet 30 and second optical sheet 40 are the same component and third optical sheet 50 and fourth optical sheet 60 are the same component. Thus, the four optical sheets of first optical sheet 30 to fourth optical sheet 60 in liquid crystal display device 1 are disposed in one of modes in parts (a) and (b) of FIG. 3 according to the direction of the absorption axis of the polarizing plate of each optical sheet.

In each of first optical sheet 30 to fourth optical sheet 60, each of polarizing plates 31, 41, 51, and 61 includes a polarizer. A resin film in which a dichroic substance such as iodine is adsorbed and aligned is used as the polarizer. For example, a polyvinyl alcohol-based resin film (PVA film) is used as the resin film used for the polarizer.

In first optical sheet 30 and second optical sheet 40, refractive index characteristics of retardation plates 32 and 42 are selected according to the driving systems of first liquid crystal cell 10 and second liquid crystal cell 20. For example, in the case of adopting the IPS system, the refractive index characteristics of retardation plates 32 and 42 may satisfy a relationship of nx≥nz>ny. At this point, "nx" is a refractive index in the direction in which an in-plane refractive index is maximized (that is, the slow axis direction), "ny" is a refractive index in the direction orthogonal to the slow axis in the plane (that is, a fast axis direction), and "nz" is a refractive index in the thickness direction. Retardation plates 32 and 42 may be a single-layer body or a laminated body. For example, the retardation plates 32 and 42 are made of a resin film, and a retardation plate in which retardation and an Nz coefficient are properly set can be used as the retardation plates 32 and 42.

In third optical sheet 50 and fourth optical sheet 60, for example, light diffusion layers 53 and 63 are a light diffusion adhesive made of a transparent adhesive such as an acrylic adhesive and light diffusing fine particles dispersed in the transparent adhesive. As an example, haze values of light diffusion layers 53 and 63 are 80%. Light diffusion layers 53 and 63 are disposed between first liquid crystal cell 10 and second liquid crystal cell 20. Consequently, generation of moire due to a pattern shape of the black matrix in second pixel formation layer 22a of second liquid crystal cell 20 can be prevented between first liquid crystal cell 10 and second liquid crystal cell 20.

In first optical sheet 30 to fourth optical sheet 60, for example, first support members 34a, 44a, 54a, and 64a, second support members 34b, 44b, 54b, and 64b, and third support members 54c and 64c are a transparent resin film such as a triacetylcellulose (TAC) film.

In first optical sheet 30 to fourth optical sheet 60, for example, first adhesive layers 35a and 45a, second adhesive layers 35b and 45b, and adhesive layers 55 and 65 are a resin agent (adhesive) having adhesiveness.

In first optical sheet 30 to fourth optical sheet 60, for example, protective layers 36, 46, 56, and 66 are a transparent surface protective film having an antireflection function.

Figure 4:
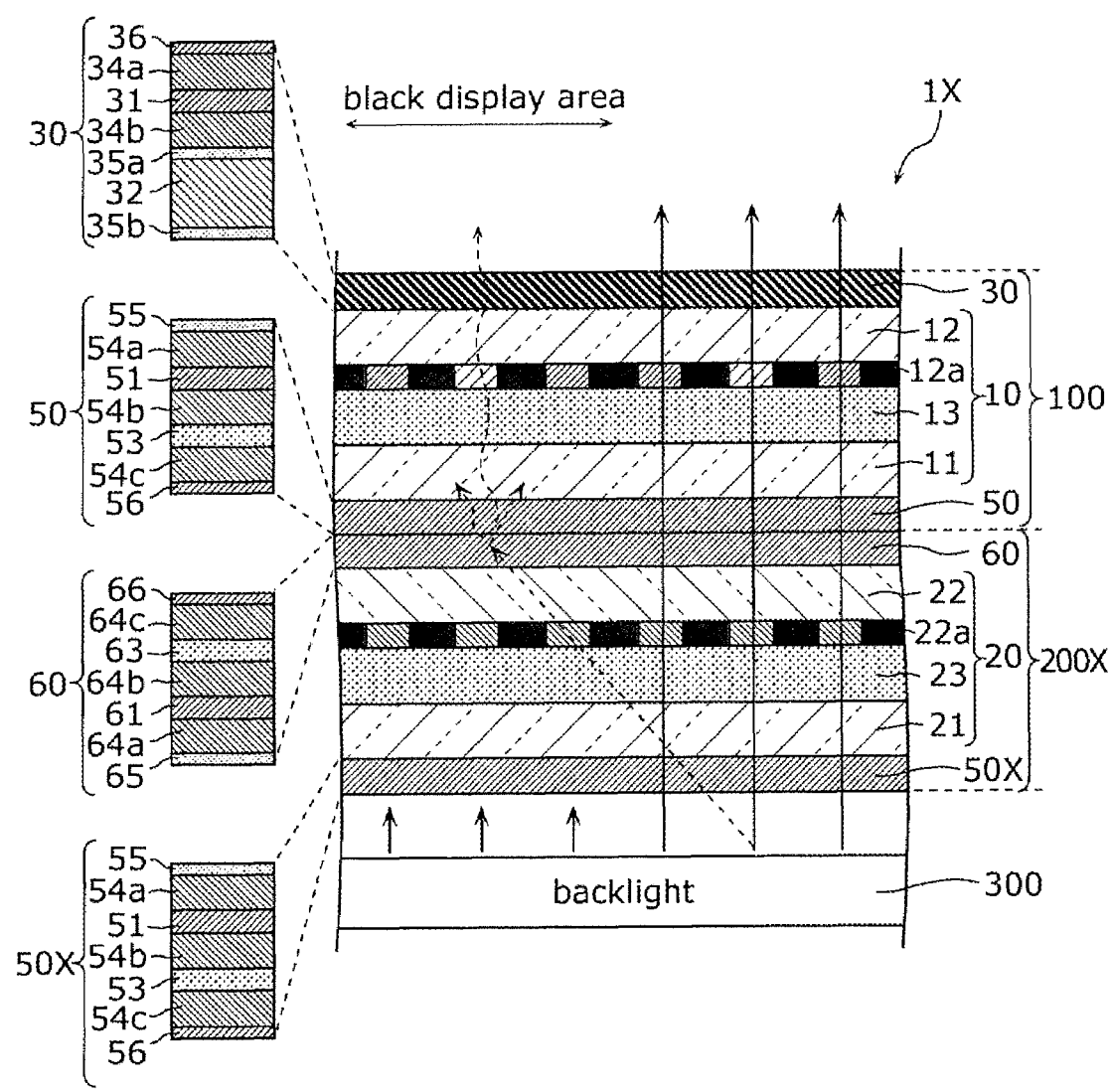
FIG. 4 is a partially enlarged sectional view illustrating a liquid crystal display device according to a first comparative example.

Optical action of liquid crystal display device 1 of the first exemplary embodiment will be described with reference to FIG. 2 while compared to FIGS. 4 and 5. FIG. 4 is a partially enlarged sectional view illustrating liquid crystal display device 1X according to a first comparative example, and FIG. 5 is a partially enlarged sectional view illustrating liquid crystal display device 1Y according to a second comparative example.

Liquid crystal display device 1X of the first comparative example in FIG. 4 is different from liquid crystal display device 1 of the first exemplary embodiment in FIG. 2 in the configuration of the second optical sheet. That is, second optical sheet 50X used in liquid crystal display device 1X of the first comparative example in FIG. 4 is the same component as third optical sheet 50 (that is, the same component as fourth optical sheet 60), but does not include the retardation plate. Thus, in liquid crystal display device 1X of the first comparative example, only retardation plate 32 disposed on the front surface side of first liquid crystal cell 10 is disposed as the retardation plate.

Figure 5:
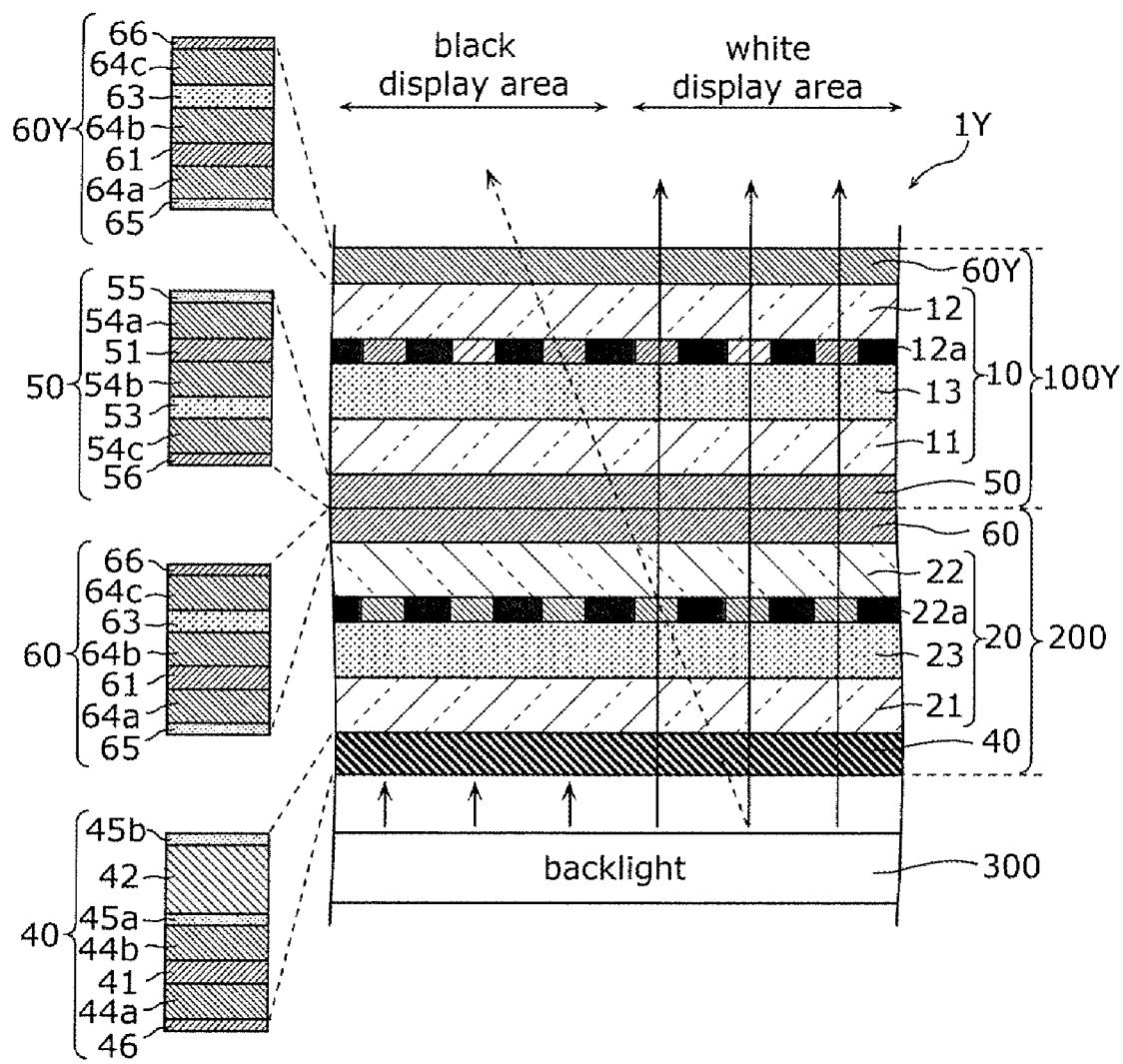
FIG. 5 is a partially enlarged sectional view illustrating a liquid crystal display device according to a second comparative example.

Liquid crystal display device 1Y of the second comparative example in FIG. 5 is different from liquid crystal display device 1 of the first exemplary embodiment in FIG. 2 in the configuration of the first optical sheet. That is, first optical sheet 60Y used in liquid crystal display device 1Y of the second comparative example in FIG. 5 is the same component as fourth optical sheet 60 (that is, the same component as third optical sheet 50), but does not include the retardation plate. Thus, the retardation plate used in liquid crystal display device 1Y of the second comparative example is only retardation plate 42 disposed on the back surface side of second liquid crystal cell 20.

As in liquid crystal display device 1X of the first comparative example in FIG. 4, the generation of halo can be prevented by disposing retardation plate 32 between polarizing plates 31 and 51. Specifically, in a low luminance region (for example, a black display region) around a high luminance region (for example, a white display region), by disposing retardation plate 32, retardation plate 32 compensates for a phase difference of the light traveling obliquely in first display panel 100 among the light incident on first display panel 100 from second display panel 200X, which allows the prevention of unintended transmission (light leakage) of the light, and resultantly the generation of the halo can be prevented.

However, in order to prevent the moire caused by the pattern shape of the black matrix of second liquid crystal cell 20, third optical sheet 50 or fourth optical sheet 60 that is disposed between first liquid crystal cell 10 and second liquid crystal cell 20 includes light diffusion layer 53 or 63.

For this reason, as illustrated in FIG. 4, light traveling in an oblique direction among light (for example, light of white or color display) traveling from second display panel 200X to first display panel 100 is scattered by light diffusion layer 53 or 63, and sometimes part of the light travels in the front direction (upward in the plane of drawing) to leak out to a low luminance region (for example, a black display region). As a result, a phenomenon that the black image is seen floating occurs, and contrast is lowered.

On the other hand, as illustrated in FIG. 5, as in liquid crystal display device 1Y of the second comparative example, by disposing retardation plate 42 between polarizing plates 41 and 61 of second display panel 200, retardation plate 42 compensates for the phase difference of the light obliquely transmitted through second display panel 200, and polarizing plate 61 effectively shields the light. The light obliquely transmitted through second display panel 200X as illustrated in FIG. 4 can be prevented from being scattered by light diffusion layer 53 or 63 to leak out to the low luminance region. Thus, the black image can be prevented from being seen floating.

However, only one retardation plate 42 disposed on the back surface side of second liquid crystal cell 20 is used in liquid crystal display device 1Y of the second comparative example in FIG. 5. For this reason, as illustrated in FIG. 5, among the light (for example, light of white or color display) incident on first display panel 100Y from second display panel 200, the light (may inevitably be generated by light diffusion layer 53 or 63) traveling obliquely in first display panel 100Y comes out of first display panel 100Y In this case, for example, the light comes out in a black display region around a white display region, and a white display portion such as a white line is out of focus. For this reason, the image quality is degraded.

On the other hand, as illustrated in FIG. 2, two retardation plates 32 and 42 are used in liquid crystal display device 1 of the first exemplary embodiment. Specifically, retardation plate 32 is disposed between polarizing plates 31 and 51 of first display panel 100, and retardation plate 42 is disposed between polarizing plates 41 and 61 of second display panel 200. In particular, retardation plate 32 (first retardation plate) is disposed on the front surface side (observer side) of first liquid crystal cell 10. Retardation plate 42 (second retardation plate) is disposed on the back surface side (the side of backlight 300) of second liquid crystal cell 20. That is, one retardation plate is disposed on each of both outsides of first liquid crystal cell 10 and second liquid crystal cell 20.

Consequently, as illustrated in FIG. 5, retardation plate 32 can prevent the light traveling obliquely in first display panel 100 among the light (for example, light of white or color display) incident on first display panel 100 from second display panel 200, from coming out (leaking out) of first display panel 100, and resultantly the generation of the halo can be prevented.

Retardation plate 42 can greatly reduce the light obliquely transmitted through the second display panel 200 as illustrated in FIG. 4, so that the light traveling obliquely can be prevented from being scattered by light diffusion layer 53 or 63 to leak out to the low luminance region even if light diffusion layer 53 or 63 is disposed between first liquid crystal cell 10 and second liquid crystal cell 20. Thus, the black image can be prevented from being seen floating, and a high contrast ratio can be obtained.

For example, in the case where only one retardation plate 32 is disposed on the front surface side of first liquid crystal cell 10 as in liquid crystal display device 1X of the first comparative example in FIG. 4, the contrast ratio is about 370000:1. On the other hand, in the case where two retardation plates 32 and 42 are used as in liquid crystal display device 1 of the first exemplary embodiment in FIG. 2, a high contrast ratio of about 1300000:1 can be obtained.

As described above, liquid crystal display device 1 of the first exemplary embodiment includes first liquid crystal cell 10 disposed at a position close to the observer, second liquid crystal cell 20 disposed at a position farther from the observer than first liquid crystal cell 10, and first optical sheet 30 and second optical sheet 40 each of which is an optical sheet in which polarizing plate 31 (or 41) and retardation plate 32 (or 42) are laminated, first optical sheet 30 and second optical sheet 40 being an identical component, in which first optical sheet 30 is disposed on the front surface side of first liquid crystal cell 10, and second optical sheet 40 is disposed on the back surface side of second liquid crystal cell 20.

With this configuration, liquid crystal display device 1 capable of displaying the image with high contrast ratio and high image quality at low cost while preventing the generation of the halo can be constructed.

Second Exemplary Embodiment

Figure 6:
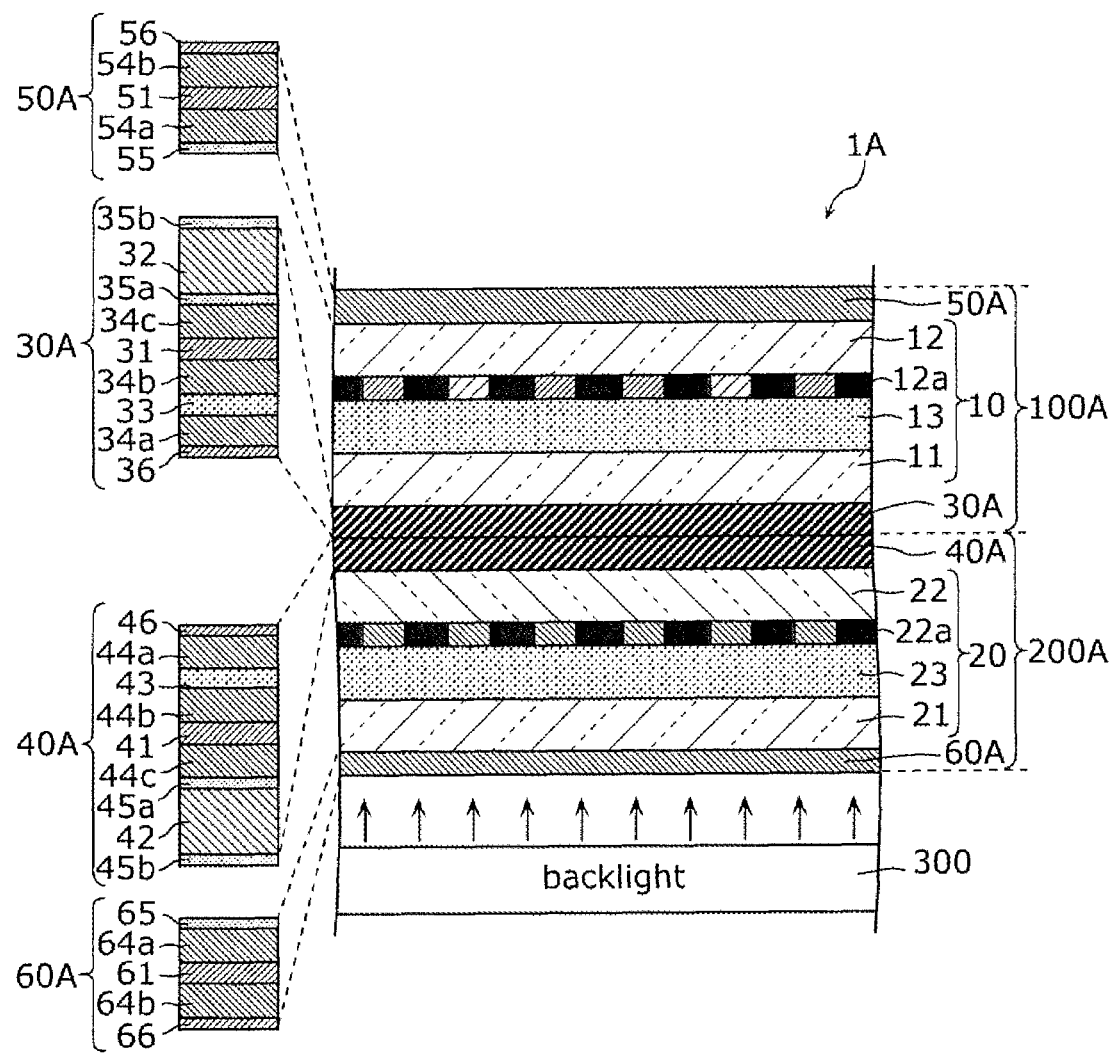
FIG. 6 is a partially enlarged sectional view illustrating a liquid crystal display device according to a second exemplary embodiment.

Liquid crystal display device 1A according to a second exemplary embodiment will be described below with reference to FIG. 6. FIG. 6 is a partially enlarged sectional view illustrating liquid crystal display device 1A of the second exemplary embodiment.

Liquid crystal display device 1A of the second exemplary embodiment is different from liquid crystal display device 1 of the first exemplary embodiment in positions and structures of the first optical sheet and the second optical sheet.

That is, as illustrated in FIG. 2, in liquid crystal display device 1 of the first exemplary embodiment, first optical sheet 30 and second optical sheet 40 are disposed on both outsides of first liquid crystal cell 10 and second liquid crystal cell 20. On the other hand, as illustrated in FIG. 6, in liquid crystal display device 1A of the second exemplary embodiment, first optical sheet 30A and second optical sheet 40A are disposed inside first liquid crystal cell 10 and second liquid crystal cell 20. That is, in the second exemplary embodiment, two retardation plates 32 and 42 are disposed inside first liquid crystal cell 10 and second liquid crystal cell 20.

As illustrated in FIG. 2, in liquid crystal display device 1 of the first exemplary embodiment, first optical sheet 30 and second optical sheet 40 do not include the light diffusion layer. On the other hand, as illustrated in FIG. 6, in liquid crystal display device 1A of the second exemplary embodiment, first optical sheet 30A includes light diffusion layer 33, and second optical sheet 40A includes light diffusion layer 43.

Additionally, liquid crystal display device 1A of the second exemplary embodiment is different from liquid crystal display device 1 of the first exemplary embodiment in positions and structures of the third optical sheet and the fourth optical sheet.

The detailed configuration of liquid crystal display device 1A according to the second exemplary embodiment will be described below by focusing on differences from liquid crystal display device 1 of the first exemplary embodiment.

As illustrated in FIG. 6, liquid crystal display device 1A includes first display panel 100A, second display panel 200A, and backlight 300. Liquid crystal display device 1A also includes first liquid crystal cell 10, second liquid crystal cell 20, first optical sheet 30A, second optical sheet 40A, third optical sheet 50A, and fourth optical sheet 60A.

First display panel 100A is constructed with first liquid crystal cell 10, first optical sheet 30A, and third optical sheet 50A. Second display panel 200A is constructed with second liquid crystal cell 20, second optical sheet 40A, and fourth optical sheet 60A.

Similarly to first optical sheet 30 of the first exemplary embodiment, first optical sheet 30A is an optical sheet in which the plurality of laminated films including polarizing plate 31 and retardation plate 32 are laminated and integrated. First optical sheet 30A of the second exemplary embodiment further includes light diffusion layer 33 laminated on polarizing plate 31 and retardation plate 32 as the laminated film.

More specifically, first optical sheet 30A is one optical film including polarizing plate 31, retardation plate 32, light diffusion layer 33, first support member 34a, second support member 34b, and third support member 34c between which light diffusion layer 33 and polarizing plate 31 are sequentially sandwiched, first adhesive layer 35a and second adhesive layer 35b between which retardation plate 32 is sandwiched, and protective layer 36 provided on first support member 34a as the outermost layer.

In first optical sheet 30A of the second exemplary embodiment, similarly to the first exemplary embodiment, the absorption axis of polarizing plate 31 and the slow axis of retardation plate 32 are configured to be substantially orthogonal to each other. Alternatively, the absorption axis of polarizing plate 31 and the slow axis of retardation plate 32 may not be orthogonal to each other.

Similarly to second optical sheet 40 of the first exemplary embodiment, second optical sheet 40A is an integrated optical sheet in which the plurality of laminated films including polarizing plate 41 and retardation plate 42 are laminated. Second optical sheet 40A of the second exemplary embodiment further includes light diffusion layer 43 laminated on polarizing plate 41 and retardation plate 42 as the laminated film.

More specifically, second optical sheet 40A is an optical film including polarizing plate 41, retardation plate 42, light diffusion layer 43, first support member 44a, second support member 44b, and third support member 44c between which light diffusion layer 43 and polarizing plate 41 are sequentially sandwiched, first adhesive layer 45a and second adhesive layer 45b between which retardation plate 42 is sandwiched, and protective layer 46 provided on first support member 44a as the outermost layer.

In second optical sheet 40A of the second exemplary embodiment, similarly to first optical sheet 30A, the absorption axis of polarizing plate 41 and the slow axis of retardation plate 42 are configured to be substantially orthogonal to each other. Alternatively, the absorption axis of polarizing plate 41 and the slow axis of retardation plate 42 may not be orthogonal to each other.

First optical sheet 30A and second optical sheet 40A thus configured are an identical component. That is, first optical sheet 30A and second optical sheet 40A have the same layer structure, and the same film (layer) is laminated in the same order in the laminated films of first optical sheet 30A and second optical sheet 40A. In this way, first optical sheet 30A and second optical sheet 40A are formed as the same component, which allows the component to be commonly used to reduce the cost. First optical sheet 30A and second optical sheet 40A are disposed in opposite directions.

In the second exemplary embodiment, unlike the first exemplary embodiment, first optical sheet 30A is disposed on the back surface side of first liquid crystal cell 10 and second optical sheet 40A is disposed on the front surface side of second liquid crystal cell 20. That is, first optical sheet 30A and second optical sheet 40A are disposed so as to be positioned inside first liquid crystal cell 10 and second liquid crystal cell 20 (between first liquid crystal cell 10 and second liquid crystal cell 20).

Specifically, first optical sheet 30A is bonded to first liquid crystal cell 10 by adhering second adhesive layer 35b of first optical sheet 30A to the back surface of first liquid crystal cell 10. In this case, second adhesive layer 35b, retardation plate 32, first adhesive layer 35a, third support member 34c, polarizing plate 31, second support member 34b, light diffusion layer 33, first support member 34a, and protective layer 36 are arranged in this order from the front surface side toward the back surface side of first liquid crystal cell 10. Second optical sheet 40A is bonded to second liquid crystal cell 20 by adhering second adhesive layer 45b of second optical sheet 40A to the front surface of second liquid crystal cell 20. In this case, protective layer 46, first support member 44a, light diffusion layer 43, second support member 44b, polarizing plate 41, third support member 44c, first adhesive layer 45a, retardation plate 42, and second adhesive layer 45b are arranged in this order from the front surface side toward the back surface side of second liquid crystal cell 20.

Third optical sheet 50A is an optical sheet (polarizing film) including at least polarizing plate 51. In the second exemplary embodiment, third optical sheet 50A is constructed with the plurality of laminated films, and further includes first support member 54a and second support member 54b between which polarizing plate 51 is sandwiched, adhesive layer 55 provided on first support member 54a, and protective layer 56 provided on second support member 54b as the outermost layer.

Fourth optical sheet 60A is an optical sheet (polarizing film) including at least polarizing plate 61. In the second exemplary embodiment, fourth optical sheet 60A is constructed with the plurality of laminated films, and further includes first support member 64a and second support member 64b between which polarizing plate 61 is sandwiched, adhesive layer 65 provided on first support member 64a, and protective layer 66 provided on second support member 64b as the outermost layer.

Third optical sheet 50A and fourth optical sheet 60A thus configured are an identical component. That is, third optical sheet 50A and fourth optical sheet 60A have the same layer structure, and the same film (layer) is laminated in the same order in the laminated films of third optical sheet 50A and fourth optical sheet 60A. In this way, third optical sheet 50A and fourth optical sheet 60A are formed as the same component, which allows the component to be commonly used to reduce the cost. Third optical sheet 50A and fourth optical sheet 60A are disposed in opposite directions.

In the second exemplary embodiment, unlike the first exemplary embodiment, third optical sheet 50A is disposed on the front surface side of first liquid crystal cell 10 and fourth optical sheet 60A is disposed on the back surface side of second liquid crystal cell 20. That is, third optical sheet 50A and fourth optical sheet 60A are disposed so as to be positioned on both outsides of first liquid crystal cell 10 and second liquid crystal cell 20.

Specifically, third optical sheet 50A is adhered to first liquid crystal cell 10 by bonding adhesive layer 55 of third optical sheet 50A to the front surface of first liquid crystal cell 10. Fourth optical sheet 60A is adhered to second liquid crystal cell 20 by bonding adhesive layer 65 of fourth optical sheet 60A to the front surface of second liquid crystal cell 20.

In first display panel 100A, first optical sheet 30A and third optical sheet 50A are bonded to first liquid crystal cell 10 such that first liquid crystal cell 10 is sandwiched therebetween. In this case, first optical sheet 30A and third optical sheet 50A are disposed such that the polarization directions of polarizing plates 31 and 51 are orthogonal to each other, and the absorption axes of polarizing plates 31 and 51 are orthogonal to each other.

In second display panel 200A, second optical sheet 40A and fourth optical sheet 60A are bonded to second liquid crystal cell 20 such that second liquid crystal cell 20 is sandwiched therebetween. In this case, second optical sheet 40A and fourth optical sheet 60A are disposed such that the polarizing directions of polarizing plates 41 and 61 are orthogonal to each other, and the absorption axes of polarizing plates 41 and 61 are orthogonal to each other.

Even in the second exemplary embodiment, it is necessary that third optical sheet 50A and fourth optical sheet 60A disposed inside first liquid crystal cell 10 and second liquid crystal cell 20 be disposed such that polarizing plate 51 of third optical sheet 50A and polarizing plate 61 of fourth optical sheet 60A coincide with each other. That is, it is necessary that the absorption axis of polarizing plate 51 be parallel to the absorption axis of polarizing plate 61.

Thus, even in the second exemplary embodiment, first optical sheet 30A and second optical sheet 40A are the same component and third optical sheet 50A and fourth optical sheet 60A are the same component. Thus, the four optical sheets of first optical sheet 30A to fourth optical sheet 60A in liquid crystal display device 1A are disposed in one of modes in parts (a) and (b) of FIG. 7 according to the direction of the absorption axis of the polarizing plate of each optical sheet.

As the laminated films (such as polarizing plates 31, 41, 51, and 61, retardation plates 32 and 42, and light diffusion layers 33 and 43) constituting first optical sheet 30A to fourth optical sheet 60A, the same laminated films as those of first optical sheet 30 to fourth optical sheet 60 of the first exemplary embodiment can be used.

Optical action of liquid crystal display device 1A of the second exemplary embodiment will be described in comparison with liquid crystal display device 1 of the first exemplary embodiment in FIG. 2.

Figure 8:
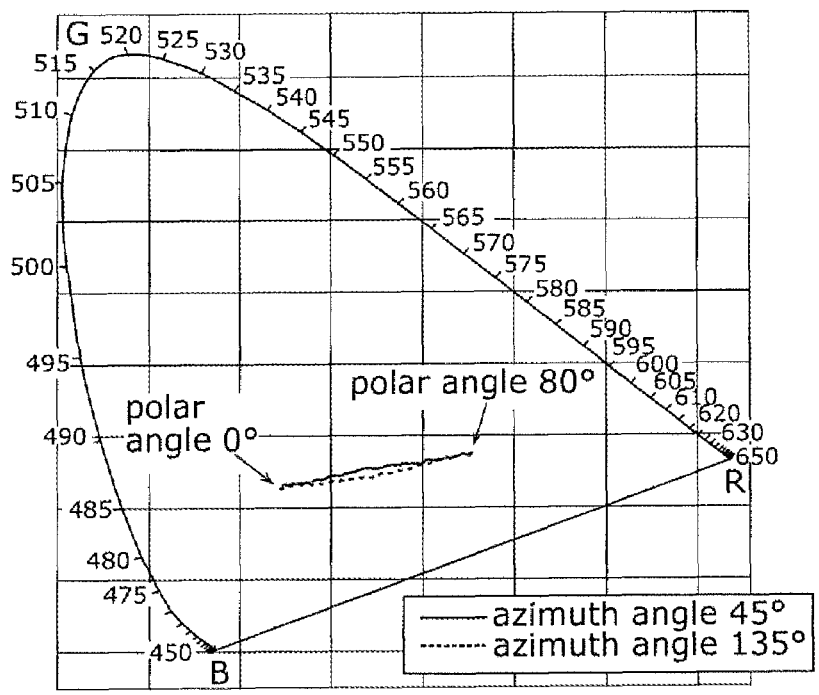
FIG. 8 is a view illustrating polar angle dependence of a black image when the retardation plate is disposed on a CF substrate side of a liquid crystal cell.

According to the study of the inventors of the present disclosure, when the retardation plate (first optical sheet 30) is disposed on the side of the counter substrate (CF substrate) of the liquid crystal cell as in first display panel 100 in FIG. 2, it was found that a color shift is generated in the case where the display panel is obliquely viewed (in the case of oblique view) as illustrated in FIG. 8.

FIG. 8 is a view illustrating polar angle dependence of the black image when the retardation plate is disposed on the CF substrate side of the liquid crystal cell. FIG. 8 illustrates a change in chromaticity at 0 gradation (black) with respect to azimuth angles of 45° (solid line) and 135° (broken line) when a polar angle is changed from 0° to 80°.

As illustrated in FIG. 8, when the retardation plate is disposed on the CF substrate side of the liquid crystal cell, it was found that the chromaticity shifted to red with increasing polar angle. That is, even though the black image is displayed, it appears as a reddish image. In this way, when the retardation plate is disposed on the CF substrate side of the liquid crystal cell, the color shift is generated in the case of oblique view.

Figure 9:
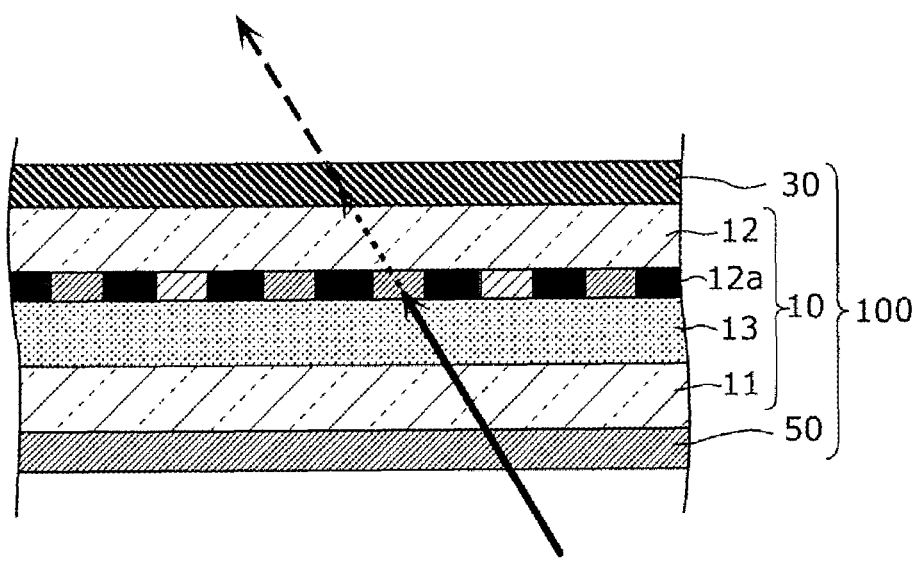
FIG. 9 is a view illustrating an influence on light transmitted through a display panel when the retardation plate is disposed on the CF substrate side of the liquid crystal cell.

As a result of intensive studies on this cause, the inventors of the present disclosure found that the color shift is generated due to the following reason. This point will be described below with reference to FIG. 9. FIG. 9 is a view illustrating an influence on light transmitted through the display panel when the retardation plate is disposed on the CF substrate side of the liquid crystal cell.

As illustrated in FIG. 9, in the case where first optical sheet 30 including retardation plate 32 (see FIG. 2) is disposed on the first counter substrate 12 (CF substrate) side of first liquid crystal cell 10, namely, on the front surface side of first liquid crystal cell 10, the light passing through first display panel 100 changes by the phase difference of the color filter in first pixel formation layer 12a of first counter substrate 12. For this reason, in retardation plate 32 of first optical sheet 30, because the phase difference of the light changed by the phase difference of the color filter changes, the state of the light varies by the phase difference depending on the color filter. This is considered to be the cause of the generation of the color shift in the case of oblique view in FIG. 8.

In the case where the retardation plate is disposed on the counter substrate (CF substrate) side of the liquid crystal cell, it is considered that the color shift can be eliminated by taking a countermeasure to design the retardation plate for each kind of color filter.

However, in this countermeasure, not only it is necessary to design the retardation plate optimum for the phase difference of the color filter, but also it is necessary to provide different kinds of retardation plates for each kind of color filter, which results in cost increase.

Figure 10:
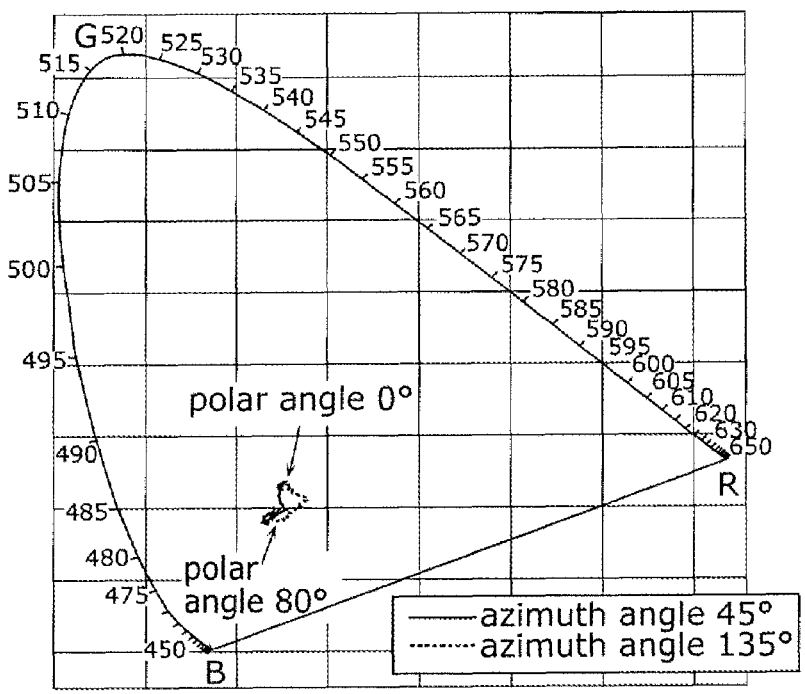
FIG. 10 is a view illustrating the polar angle dependence of the black image when the retardation plate is disposed on a first TFT substrate side of the liquid crystal cell.

On the other hand, it was found that the color shift can be prevented when the retardation plate is disposed on the TFT substrate side of the liquid crystal cell as illustrated in FIG. 10. FIG. 10 is a view illustrating the polar angle dependence of the black image when the retardation plate is disposed on the TFT substrate side of the liquid crystal cell. Similarly to FIG. 9, FIG. 10 illustrates a change in chromaticity at 0 gradation (black) with respect to azimuth angles of 45° (solid line) and 135° (broken line) when a polar angle is changed from 0° to 80°.

As illustrated in FIG. 10, in the case where the retardation plate is disposed on the TFT substrate side of the liquid crystal cell, it is found that even if the polar angle increases, the chromaticity is slightly shifted to prevent the color shift.

Figure 11:
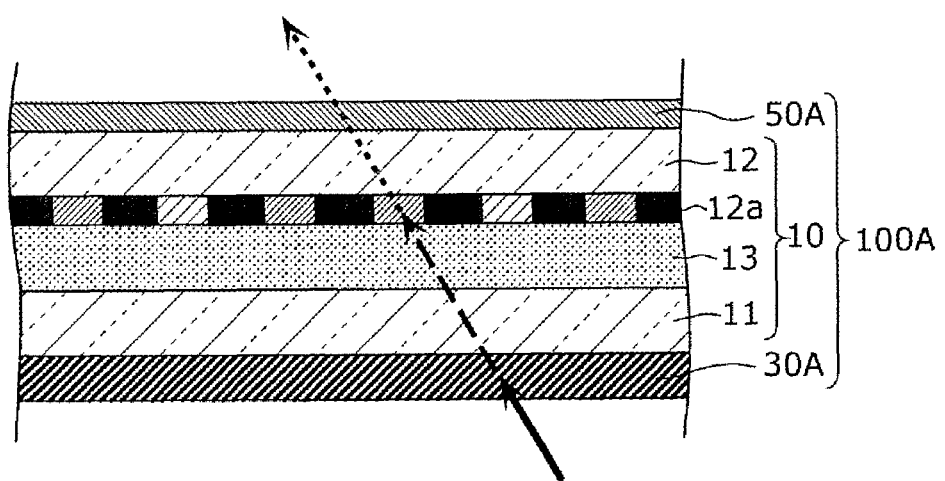
FIG. 11 is a view illustrating the influence on the light transmitted through the display panel when the retardation plate is disposed on the first TFT substrate side of the liquid crystal cell.

This is attributed to the fact that, in the case where first optical sheet 30A including retardation plate 32 (see FIG. 6) is disposed on the first TFT substrate 11 side (the back surface side of first liquid crystal cell 10) of first liquid crystal cell 10 as illustrated in FIG. 11, the phase difference of the light passing through first display panel 100A is changed by retardation plate 32 of first optical sheet 30A to improve the viewing angle, and then the phase difference of the light is changed by the phase difference of the color filter in first pixel formation layer 12a of first counter substrate 12 (CF substrate). That is, even if the light after compensation of the phase difference by retardation plate 32 passes through the color filter, the change in the phase difference by the color filter becomes small, so that color shift is hardly generated. In this way, as illustrated in FIG. 10, the color shift can be prevented by disposing first optical sheet 30A including retardation plate 32 on not the front surface side but the back surface side of first liquid crystal cell 10.

For second display panel 200A that displays the monochrome image, similarly to FIG. 10, the color shift is small in the case where the optical sheet including the retardation plate is disposed on the counter substrate side of the second liquid crystal cell or on the TFT substrate side. This is attributed to the fact that the element having the significant influence on the compensation of the phase difference by retardation plate 32 does not exist in either case because second display panel 200A does not include the color filter.

As described above, liquid crystal display device 1A of the second exemplary embodiment includes first liquid crystal cell 10 disposed at the position close to the observer, second liquid crystal cell 20 disposed at the position farther from the observer than first liquid crystal cell 10, and first optical sheet 30A and second optical sheet 40A each of which is an optical sheet in which polarizing plate 31 (or 41) and retardation plate 32 (or 42) are laminated, first optical sheet 30A and second optical sheet 40A being an identical component, in which first optical sheet 30A is disposed on the back surface side of first liquid crystal cell 10, and second optical sheet 40A is disposed on the front surface side of second liquid crystal cell 20.

With this configuration, similarly to the first exemplary embodiment, liquid crystal display device 1A that can display the high quality image with the high contrast ratio while preventing the generation of the halo can be constructed at low cost.

In the second exemplary embodiment, first optical sheet 30A is disposed on the back surface side of first liquid crystal cell 10, so that the color shift in the case of oblique viewing can be prevented as compared with the first exemplary embodiment.

In the second exemplary embodiment, first optical sheet 30A further includes light diffusion layer 33 laminated on polarizing plate 31 and retardation plate 32. Second optical sheet 40A includes light diffusion layer 43 laminated on polarizing plate 41 and retardation plate 42.

With this configuration, when first optical sheet 30A and second optical sheet 40A are disposed between first liquid crystal cell 10 and second liquid crystal cell 20, light diffusion layers 33 and 43 are also inserted between first liquid crystal cell 10 and second liquid crystal cell 20. This enables light diffusion layers 33 and 43 to prevent the generation of the moire due to the pattern shape of the black matrix in second pixel formation layer 22a of second liquid crystal cell 20. Thus, liquid crystal display device 1A capable of displaying the high quality image with the high contrast ratio while preventing the generation of the halo can be constructed at a lower cost only by disposing first optical sheet 30A and second optical sheet 40A in which the polarizing plate, the retardation plate, and the light diffusion plate are integrated between first liquid crystal cell 10 and second liquid crystal cell 20. The high contrast ratio of about 1000000:1 can be obtained in the case where two retardation plates 32 and 42 are disposed between first liquid crystal cell 10 and second liquid crystal cell 20 as in liquid crystal display device 1A of the second exemplary embodiment in FIG. 6.

In liquid crystal display device 1A of the second exemplary embodiment, the absorption axis of polarizing plate 31 and the slow axis of retardation plate 32 are substantially orthogonal to each other in first optical sheet 30A. In second optical sheet 40A, the absorption axis of polarizing plate 41 and the slow axis of retardation plate 42 are substantially orthogonal to each other.

With this configuration, the color shift as illustrated in the drawings can be improved.

(Modification of Second Exemplary Embodiment)

Figure 12A:
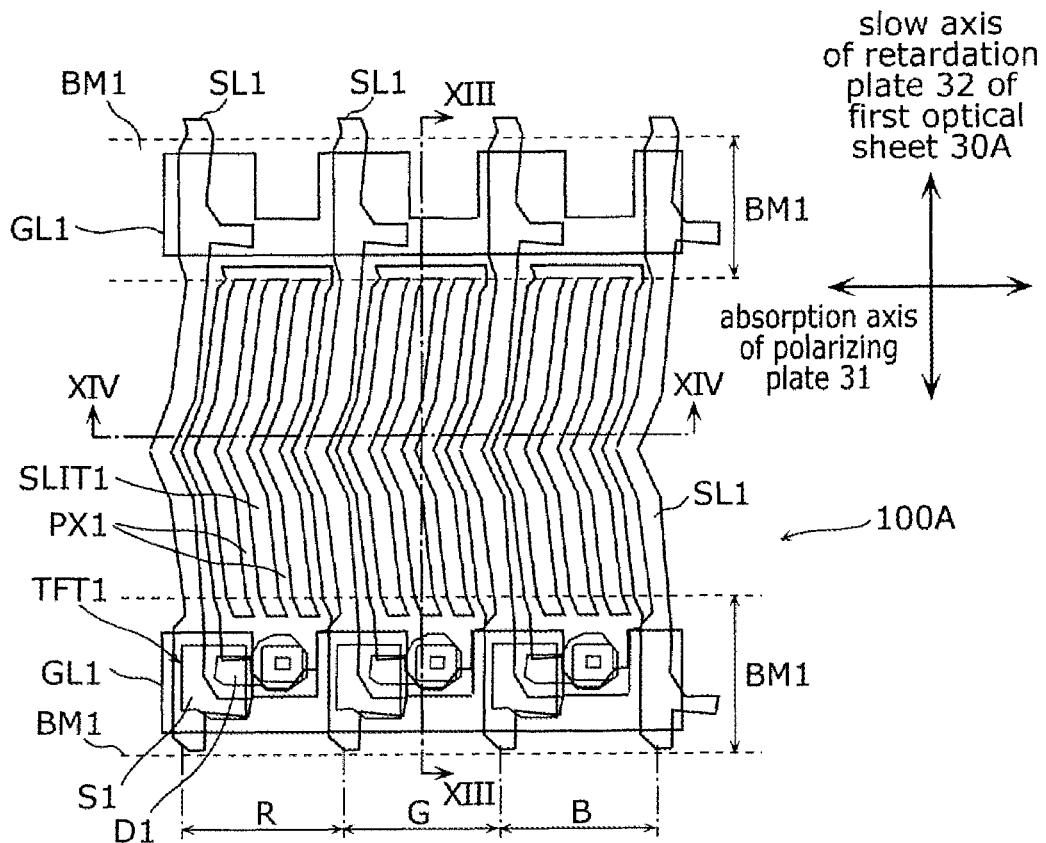
FIG. 12A is a plan view illustrating a pixel configuration of a first TFT substrate of a first display panel in a liquid crystal display device according to a modification of the second exemplary embodiment.
Figure 12B:
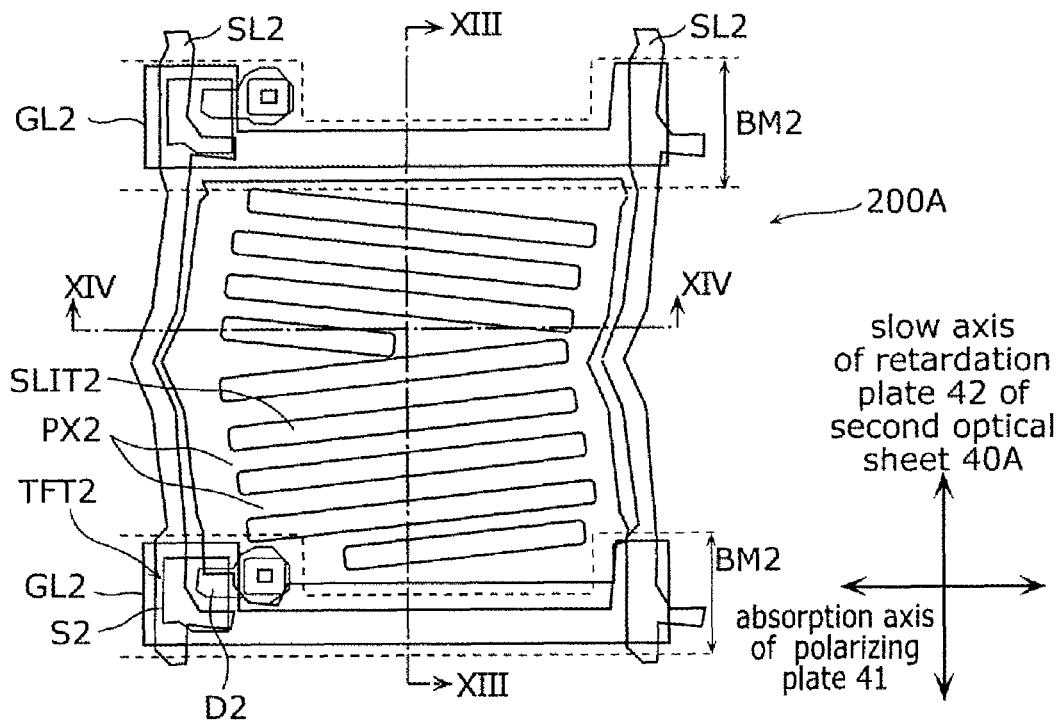
FIG. 12B is a plan view illustrating a pixel configuration of a second TFT substrate of a second display panel in a liquid crystal display device according to a modification of the second exemplary embodiment.
Figure 13:
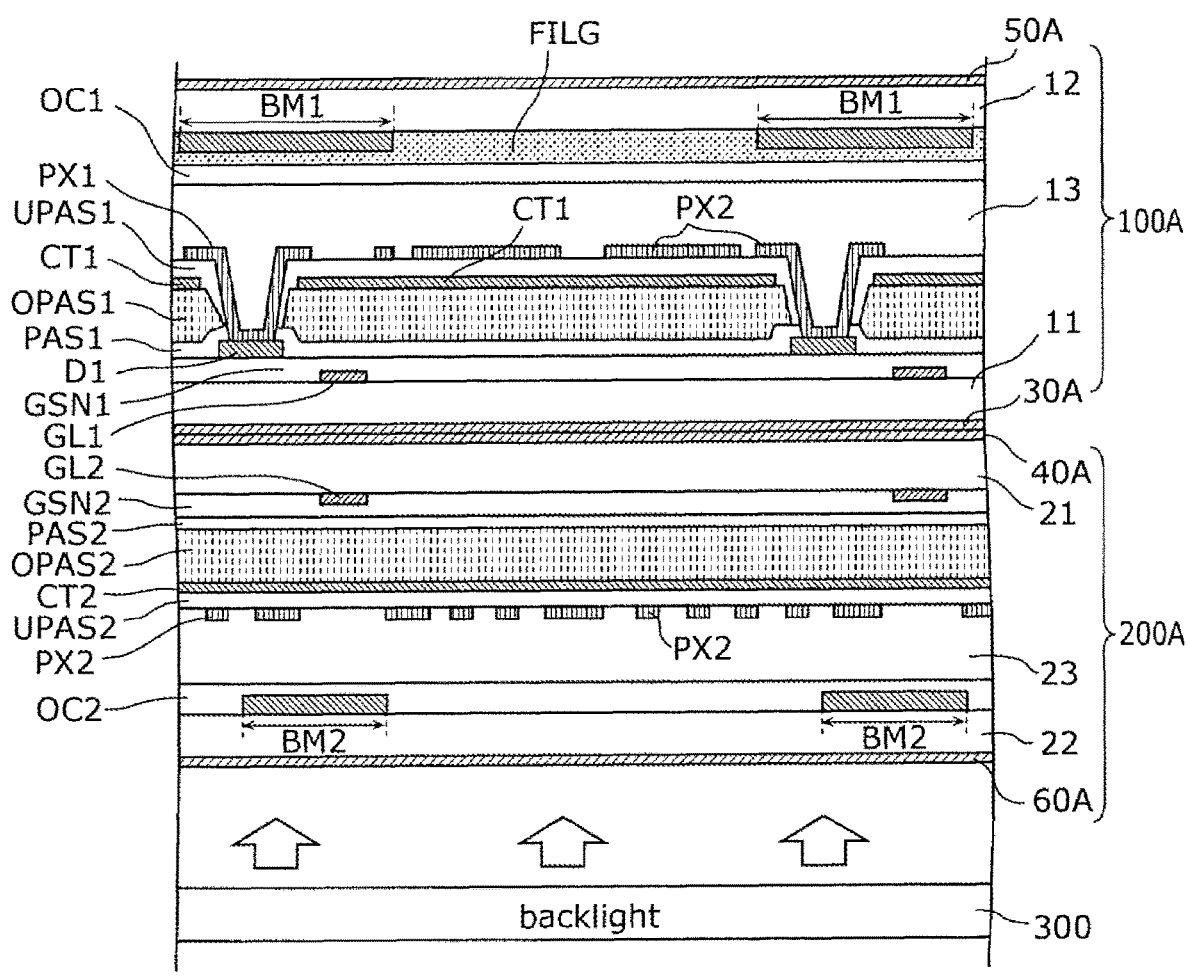
FIG. 13 is a sectional view illustrating a liquid crystal display device according to a modification of the second exemplary embodiment taken along line XIII-XIII in FIGS. 12A and 12B.

A modification of the second exemplary embodiment will be described below with reference to FIGS. 12A, 12B, 13, and 14. FIG. 12A is a plan view illustrating a pixel configuration of first TFT substrate 11 of first display panel 100A in a liquid crystal display device of the modification of the second exemplary embodiment. FIG. 12B is a plan view illustrating the pixel configuration of second TFT substrate 21 of second display panel 200A in the liquid crystal display device of the modification of the second exemplary embodiment. FIG. 13 is a sectional view of the liquid crystal display device taken along line XIII-XIII in FIGS. 12A and 12B. FIG. 14 is a sectional view of the liquid crystal display device taken along line XIV-XIV in FIGS. 12A and 12B.

Figure 7:
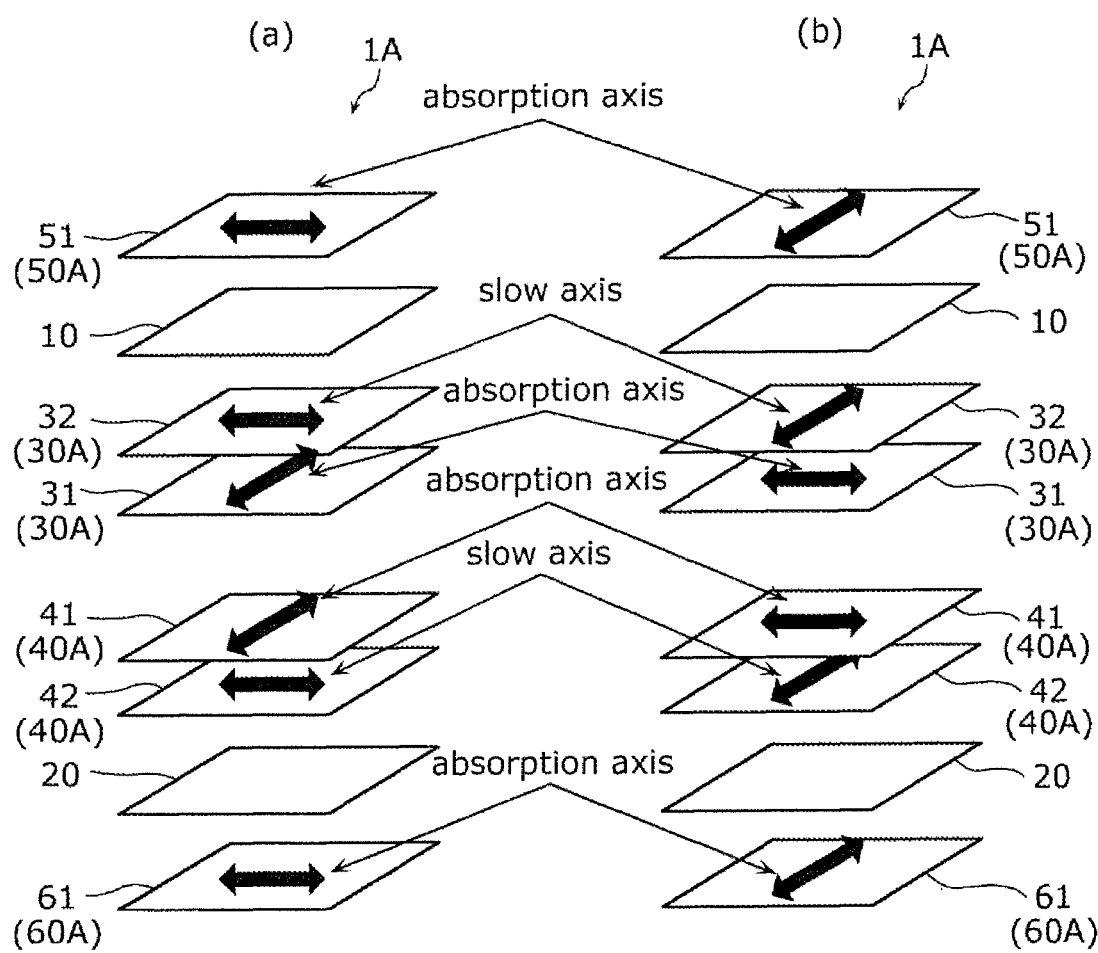
FIG. 7 is a view illustrating an arrangement relationship between a polarizing plate and a retardation plate in the liquid crystal display device of the second exemplary embodiment.

The liquid crystal display device of the modification in FIGS. 12A to 14 is the mode in a part (b) of FIG. 7 in liquid crystal display device 1A of the second exemplary embodiment in FIG. 7, the liquid crystal material of first liquid crystal layer 13 in first liquid crystal cell 10 of upper-side first display panel 100A is made of positive type liquid crystal, and the liquid crystal material of second liquid crystal layer 23 in second liquid crystal cell 20 of lower-side second display panel 200A is made of negative type liquid crystal.

The liquid crystal display device of the modification is different from liquid crystal display device 1A of the second exemplary embodiment in the disposition of second counter substrate 22 of second liquid crystal cell 20 in second display panel 200A. Specifically, in liquid crystal display device 1A of the second exemplary embodiment, second counter substrate 22 of second liquid crystal cell 20 is disposed closer to the front surface of second liquid crystal cell 20 than second TFT substrate 21. On the other hand, as illustrated in FIGS. 13 and 14, in the liquid crystal display device of the modification, second counter substrate 22 of second liquid crystal cell 20 is disposed closer to the back surface of second liquid crystal cell 20 than second TFT substrate 21.

The detailed structure of the liquid crystal display device of the modification will be described below with reference to FIGS. 12A to 14.

As illustrated in FIG. 12A, a plurality of source lines SL1 extending in a first direction (a column direction in the modification) and a plurality of gate lines GL1 extending in a second direction (a row direction in the modification) that is different from the first direction are formed on first TFT substrate 11 of first display panel 100A. In the modification, the first direction is along the slow axis of retardation plate 32, and the second direction is along the absorption axis of polarizing plate 31. TFT 1 is formed in a vicinity of each intersection of the plurality of source lines SL1 and the plurality of gate lines GL1. In planar view of first display panel 100A, a region surrounded by two source lines SL1 adjacent to each other and two gate lines GL1 adjacent to each other is defined as one pixel, and a plurality of pixels are disposed in a matrix form (the row direction and the column direction). Specifically, the plurality of pixels include a red pixel (R) for red, a green pixel (G) for green, and a blue pixel (B) for blue.

As illustrated in FIGS. 12A, 13, and 14, on first TFT substrate 11, pixel electrode PX1 is formed in each pixel, and one common electrode CT1 common to the plurality of pixels is formed. As illustrated in FIG. 12A, a plurality of slits SLIT 1 are formed in pixel electrode PX1 of first TFT substrate 11, the plurality of slits SLIT 1 extending along a direction in which an angle formed between pixel electrode PX1 of first TFT substrate 11 and the slow axis of retardation plate 32 of first optical sheet 30 is smaller than an angle formed between pixel electrode PX1 of first TFT substrate 11 and the absorption axis of polarizing plate 31 of first optical sheet 30A. In the modification, the plurality of slits SLIT 1 are formed along a direction substantially parallel to the slow axis of retardation plate 32 of first optical sheet 30A. In first TFT substrate 11, source electrode S1 of TFT 1 is electrically connected to source line SL1, drain electrode D1 of TFT 1 is electrically connected to pixel electrode PX1 through a contact hole, and a gate electrode is electrically connected to gate line GL1.

In first TFT substrate 11, gate insulator GSN 1 is formed so as to cover gate line GL1, and protective film PAS1 and organic film OPAS1 are formed so as to cover source line SL1. Common electrode CT1 is formed on organic film OPAS1, and protective film UPAS1 is formed so as to cover common electrode CT1. Pixel electrode PX1 is formed on protective film UPAS1, and an alignment film (not illustrated) is formed so as to cover pixel electrodes PX1.

A plurality of color filters corresponding to the pixels and black matrix BM1 are formed on second counter substrate 12 of first display panel 100A. The color filter of each pixel includes red color filter layers FILR (red layer) made of a red (R color) material to transmit red light, green color filter layers FILG (green layer) made of a green (G color) material to transmit green light, and blue color filter layers FILB (blue layer) made of a blue (B color) material to transmit blue light. Red color filter FILR, green color filter FILG, and blue color filter FILB are repetitively arrayed in this order in the row direction. The color filters having the same color are arrayed in the column direction, and black matrix BM1 is formed at the boundary portion between the color filters adjacent to each other in the row direction and the column direction. Corresponding to each color filter, the plurality of pixels include the red pixel (R) corresponding to red color filter FILR, the green pixel (B) corresponding to green color filter FILG, and the blue pixel (B) corresponding to blue color filter FILB. In first display panel 100A, the red pixels, the green pixels, and the blue pixels are repeatedly arrayed in this order in the row direction, and the pixels having the same color are arrayed in the column direction. The plurality of pixels may include the yellow pixel corresponding to the yellow color filter or a white pixel in which the color filter is not formed.

In first counter substrate 12, the surface of the color filter (red color filter FILR, green color filter FILG, and blue color filter FILB) is coated with overcoat film OC1, and the alignment film (not illustrated) is formed on overcoat film OC1.

As illustrated in FIG. 12B, a plurality of source lines SL2 extending in the first direction (the column direction in the modification) and the plurality of gate lines GL2 extending in the second direction (the row direction in the modification) that is different from the first direction are formed on second TFT substrate 21 of second display panel 200A. In the modification, the first direction is also along the slow axis of retardation plate 42, and the second direction is also along the absorption axis of polarizing plate 41. TFT 2 is formed in the vicinity of each intersection of the plurality of source lines SL2 and the plurality of gate lines GL2. In planar view of second display panel 200A, a region surrounded by two source lines SL2 adjacent to each other and two gate lines GL2 adjacent to each other is defined as one pixel, and a plurality of pixels are disposed in a matrix form (the row direction and the column direction). One pixel in second display panel 200A corresponds to three pixels in first display panel 100A.

As illustrated in FIGS. 12B, 13, and 14, on second TFT substrate 21, pixel electrode PX2 is formed in each pixel, and one common electrode CT2 common to the plurality of pixels is formed. As illustrated in FIG. 12B, a plurality of slits SLIT2 are formed in pixel electrode PX2 of second TFT substrate 21, the plurality of slits SLIT2 extending along a direction in which an angle formed between pixel electrode PX2 of second TFT substrate 21 and the slow axis of retardation plate 42 of second optical sheet 40 is larger than an angle formed between pixel electrode PX2 of second TFT substrate 21 and the absorption axis of polarizing plate 41 of second optical sheet 40A. In the modification, the plurality of slits SLIT2 are formed along a direction substantially parallel to the absorption axis of polarizing plate 41 of second optical sheet 40A. In second TFT substrate 21, source electrode S2 of TFT 2 is electrically connected to source line SL2, drain electrode D2 of TFT 2 is electrically connected to pixel electrode PX2 through the contact hole, and a gate electrode is electrically connected to gate line GL2.

In second TFT substrate 21, gate insulator GSN2 is formed so as to cover gate line GL2, and protective film PAS2 and organic film OPAS2 are formed so as to cover source line SL2. Common electrode CT2 is formed on organic film OPAS2, and protective film UPAS2 is formed so as to cover common electrode CT2. Pixel electrodes PX2 are formed on protective film UPAS2, and an alignment film (not illustrated) is formed so as to cover pixel electrodes PX2.

Black matrix BM2 is formed on second counter substrate 22 of second display panel 200A. The color filter is not formed on second counter substrate 22. In second counter substrate 22, overcoat film OC2 is formed so as to cover black matrix BM2, and an alignment film (not illustrated) is formed on overcoat film OC2.

As described above, in the liquid crystal display device of the modification, because the retardation plate is properly disposed with respect to first display panel 100A and second display panel 200A, the high quality image can be displayed with the high contrast ratio at low cost similarly to liquid crystal display device 1A of the second exemplary embodiment.

In the liquid crystal display device of the modification, first counter substrate 12 of first liquid crystal cell 10 is disposed closer to the front surface of first liquid crystal cell 10 than first TFT substrate 11, and second counter substrate 22 of second liquid crystal cell 20 is disposed closer to the back surface of second liquid crystal cell 20 than second TFT substrate 21. Consequently, the liquid crystal display device capable of displaying the image having the excellent image quality can be constructed.

In the liquid crystal display device of the modification, the liquid crystal material of first liquid crystal layer 13 of first liquid crystal cell 10 is positive type liquid crystal, the liquid crystal material of second liquid crystal layer 23 of second liquid crystal cell 20 is negative type liquid crystal. The transmittance of second display panel 200A can be improved using the negative type liquid crystal as the liquid crystal material of second liquid crystal layer 23. Because a temperature of second display panel 200A that is relatively close to backlight 300 is easily raised due to the light from backlight 300, the negative type liquid crystal having a good operating characteristic at high temperatures is used as the liquid crystal material of second liquid crystal layer 23, which allows improvement of a response characteristic at high temperature.

In the liquid crystal display device of the modification, when special attention is paid to the effect of the image quality to sacrifice the effect that prevents the generation of the halo by the disposition of the retardation plate and the effect that prevents the color shift in obliquely viewing the display panel, first optical sheet 30A, second optical sheet 40A, third optical sheet 50A, and fourth optical sheet 60A are not necessarily required.

In the liquid crystal display device of the modification, second counter substrate 22 of second liquid crystal cell 20 is disposed closer to the back surface of second liquid crystal cell 20 than second TFT substrate 21. That is, second display panel 200A is disposed such that second TFT substrate 21 is located at the observer and such that second counter substrate 22 is located on the backlight 300 side. Consequently, heat from backlight 300 can effectively be blocked by the black matrix formed on second counter substrate 22, so that degradation of the liquid crystal display device due to the heat and the decrease of the image quality can be prevented.

EXAMPLES

The present disclosure will more specifically be described below by examples, but the present disclosure is not limited to the examples. In the examples, samples 1 to 6 were prepared by changing the disposition of the retardation plate in the liquid crystal display device.

[Sample 1]

The retardation plate-attached polarizing plate (refractive index characteristics of the retardation plate: nx>nz>ny, and the angle formed between the slow axis of the retardation plate and the absorption axis of the polarizing plate: 90°) was bonded onto the counter substrate (CF substrate) side of the first liquid crystal cell for color image display such that the retardation plate was located closer to the first liquid crystal cell side than the polarizing plate. The liquid crystal having the positive dielectric anisotropy is adopted as the liquid crystal layer of the first liquid crystal cell, and the bonding was performed such that the absorption axis of the polarizing plate was orthogonal to a long-axis direction during absence of the electric field applied to the liquid crystal layer (liquid crystal molecules aligned in homogeneous array in the state of applying no electric field) included in the first liquid crystal cell. The polarizing plate (without retardation plate) was bonded to the TFT substrate side of the first liquid crystal cell such that the absorption axis of the polarizing plate was orthogonal to the absorption axis of the polarizing plate on the counter substrate side. In this way, a first display panel was obtained.

The polarizing plates (without retardation plate) were bonded to both sides of the second liquid crystal cell for black and white image display such that the absorption axes of the polarizing plates were orthogonal to each other. The liquid crystal having the positive dielectric anisotropy is adopted as the liquid crystal layer of the second liquid crystal cell, and the bonding was performed such that the absorption axis of one of the polarizing plates was orthogonal to the long-axis direction during the absence of the electric field applied to the liquid crystal layer (liquid crystal molecules aligned in homogeneous array in the state of applying no electric field) included in the second liquid crystal cell. In this way, a second display panel was obtained.

The second display panel was laminated on the side on which the TFT substrate was disposed with respect to the liquid crystal layer of the first display panel while the laminated body containing light diffusing adhesive is interposed therebetween. At this point, the lamination is performed such that the absorption axis of the polarizing plate on the TFT substrate side of the first liquid crystal cell of the first display panel becomes parallel to the absorption axis of the polarizing plate on the counter substrate side of the second liquid crystal cell of the second display panel. Thus, a liquid crystal display device according to sample 1 was obtained.

As described above, in the liquid crystal display device of sample 1, only the polarizing plate on the counter substrate (CF substrate) side of the first liquid crystal cell for color image display is configured as the retardation plate-attached polarizing plate.

[Sample 2]

The liquid crystal display device was obtained similarly to sample 1 except that the polarizing plate on which the retardation plate was not laminated was bonded onto the counter substrate side and that the retardation plate-attached polarizing plate was bonded onto the TFT substrate side in preparing the first display panel. That is, in the liquid crystal display device of sample 2, only the polarizing plate on the TFT substrate side of the first liquid crystal cell for color image display is formed as the retardation plate-attached polarizing plate.

[Sample 3]

The liquid crystal display device was obtained similarly to sample 1 except that the polarizing plate on which the retardation plate was not laminated was bonded onto the counter substrate side in preparing the first display panel, and that the retardation plate-attached polarizing plate was bonded onto the counter substrate side in preparing the second display panel. That is, in the liquid crystal display device of sample 3, only the polarizing plate on the counter substrate side of the second liquid crystal cell for black and white image display is formed as the retardation plate-attached polarizing plate.

[Sample 4]

The liquid crystal display device was obtained similarly to sample 1 except that the polarizing plate on which the retardation plate was not laminated was bonded onto the counter substrate side in preparing the first display panel, and that the retardation plate-attached polarizing plate was bonded onto the TFT substrate side in preparing the second display panel. That is, in the liquid crystal display device of sample 4, only the polarizing plate on the TFT substrate side of the second liquid crystal cell for black and white image display is formed as the retardation plate-attached polarizing plate.

[Sample 5]

The liquid crystal display device was obtained similarly to sample 1 except that the polarizing plate on which the retardation plate was not laminated was bonded onto the counter substrate side while the retardation plate-attached polarizing plate was bonded onto the TFT substrate side in preparing the first display panel, and that the retardation plate-attached polarizing plate was bonded onto the TFT substrate side in preparing the second display panel. That is, in the liquid crystal display device of sample 5, the polarizing plate on the TFT substrate side of the first liquid crystal cell for color image display is formed as the retardation plate-attached polarizing plate, and the polarizing plate on the TFT substrate side of the liquid crystal cell for black and white image display is formed as the retardation plate-attached polarizing plate.

[Sample 6]

The liquid crystal display device was obtained similarly to sample 1 except that the retardation plate-attached polarizing plate was bonded onto the TFT substrate side in preparing the second display panel. That is, in the liquid crystal display device of sample 6, the polarizing plate on the counter substrate side of the first liquid crystal cell for color image display is formed as the retardation plate-attached polarizing plate, and the polarizing plate on the TFT substrate side of the second liquid crystal cell for black and white image display is formed as the retardation plate-attached polarizing plate.

The liquid crystal display device of sample 6 corresponds to the liquid crystal display device of the first exemplary embodiment in FIG. 2.

[Sample 7]

The liquid crystal display device was obtained similarly to sample 1 except that the polarizing plate on which the retardation plate was not laminated was bonded onto the counter substrate side while the retardation plate-attached polarizing plate was bonded onto the TFT substrate side in preparing the first display panel, and that the retardation plate-attached polarizing plate was bonded onto the counter substrate side in preparing the second display panel. That is, in the liquid crystal display device of sample 7, the polarizing plate on the TFT substrate side of the first liquid crystal cell for color image display is formed as the retardation plate-attached polarizing plate, and the polarizing plate on the counter substrate side of the liquid crystal cell for black and white image display is formed as the retardation plate-attached polarizing plate.

The liquid crystal display device of sample 7 corresponds to the liquid crystal display device of the second exemplary embodiment in FIG. 6.

[Sample 8]

The liquid crystal display device was obtained similarly to sample 1 except that the retardation plate-attached polarizing plate was bonded to the counter substrate side in preparing the second display panel. That is, in the liquid crystal display device of sample 8, the polarizing plate on the counter substrate side of the first liquid crystal cell for color image display is formed as the retardation plate-attached polarizing plate, and the polarizing plate on the counter substrate side of the second liquid crystal cell for black and white image display is formed as the retardation plate-attached polarizing plate.

[Evaluation of Samples 1 to 8]

The generation of the halo, the white luminance in the front direction, and the contrast in the front direction were evaluated with respect to the liquid crystal display devices of samples 1 to 8.

The generation of the halo was evaluated by visually inspecting the presence or absence (degree) of light leakage (bright shadow corresponding to a high luminance region rising up in the black display region) in a low luminance region (black display region) around the high luminance region (white display region) when a first master image in which the low luminance region is disposed around the high luminance region is displayed.

A signal having maximum gradation was input to the two display panels of the first display panel and the second display panel, the backlight is lit while the transmittances of the two display panels are maximized, and the luminance from the front direction of the liquid crystal display device was measured, thereby evaluating the white luminance in the front direction.

A signal having minimum gradation was input to the two display panels of the first display panel and the second display panel, the backlight is lit while the transmittances of the two display panels were minimized, the luminance (black luminance in the front direction) from the front direction of the display device was measured, and the white luminance in the front direction was divided by the measured value to evaluate the contrast in the front direction.

Table 1 illustrates evaluation results of the liquid crystal display devices of samples 1 to 8 evaluated in this manner.

TABLE 1

| | | | One retardation plate | | | | Two retardation plates | | | |
|---|---|---|---|---|---|---|---|---|---|---|
| | | | Sample 1 | Sample 2 | Sample 3 | Sample 4 | Sample 5 | Sample 6 | Sample 7 | Sample 8 |
| Specification | First display panel (First liquid crystal cell) | Counter substrate side (CF substrate side) | ○ | — | — | — | — | ○ | — | ○ |
| | | TFT substrate side | — | ○ | — | — | ○ | — | ○ | — |
| | Second display panel (Second liquid crystal cell) | Counter substrate side | — | — | ○ | — | — | — | ○ | ○ |
| | | TFT substrate side | — | — | — | ○ | ○ | ○ | — | — |
| Evaluation | Generation of halo | | Absence | Absence | Presence | Presence | Absence | Absence | Absence | Absence |
| | White luminance (cd/m$^2$) | | 418 | 420 | 419 | 413 | 448 | 440 | 428 | 434 |
| | Contrast | | 374,649 | 307,386 | 935,154 | 1,393,770 | 1,170623 | 1,318,439 | 995.521 | 1,178,270 |

As illustrated in Table 1, in samples 1, 2, 5 to 8, the generation of the halo was satisfactorily prevented. On the other hand, the generation of the halo was recognized in samples 3 and 4.

This is attributed to the fact that, in samples 1, 2, 5 to 8, the retardation plate is disposed on the first display panel (panel for color image display) on the observer side, the retardation plate of the first display panel compensates for the phase difference of the light traveling obliquely in the first display panel among the light incident on the first display panel from the second display panel when the first master image is displayed on the liquid crystal display device, and the light was satisfactorily shielded by the polarizing plate on the counter substrate (CF substrate) side of the first liquid crystal cell of the first display panel. As a result, it is considered that the light leakage has not occurred in the low luminance region around the high luminance region when the first master image is displayed.

On the other hand, in samples 3 and 4, because the retardation plate is not disposed on the first display panel, when the first master image is displayed on the liquid crystal display device, part of the light traveling obliquely in the first display panel among the light incident on the first display panel from the second display panel is not shielded by the polarizing plate on the counter substrate side of the first liquid crystal cell of the first display panel, and leaks out to the low luminance region around the high luminance region to generate the halo. In samples 3 and 4, the contrast in the front direction was relatively large.

Samples 5 to 8 had much better contrast than sample 1. This is attributed to the fact that, in samples 5 to 8, the retardation plate is disposed on the second display panel (panel for black and white image display) on the backlight side and compensates for the phase difference of the light transmitted through the second display panel obliquely during black display, and the polarizing plate on the counter substrate side of the second liquid crystal cell of the second display panel was satisfactorily shielded. As a result, during the black display, an amount of light incident on the first display panel through the second display panel decreases, the black luminance in the front direction decreases, and the contrast is considered to be considerably high.

(Modifications)

The liquid crystal display device of the present disclosure has been described above based on the first and second exemplary embodiments. However, the present disclosure is not limited to the first and second exemplary embodiments.

For example, in the first and second exemplary embodiments, the liquid crystal display device is formed using the two display panels. However, the present disclosure is not limited thereto, and the liquid crystal display device may be formed using at least three display panels.

In the first and second exemplary embodiments, the liquid crystal display device is formed using two retardation plates. Alternatively, a number of retardation plates is not limited to two.

Those skilled in the art will readily appreciate that many modifications are possible in the above exemplary embodiment and variations without materially departing from the novel teachings and advantages of the present disclosure. Accordingly, all such modifications are intended to be included within the scope of the present disclosure.

The invention claimed is:

1. A liquid crystal display device comprising:
a first liquid crystal cell;
a second liquid crystal cell disposed at a position farther from an observer than the first liquid crystal cell; and
a first optical sheet and a second optical sheet each of which is an optical sheet in which a polarizing plate and a retardation plate are laminated, the first optical sheet and the second optical sheet having an identical layer structure, wherein
each of the first liquid crystal cell and the second liquid crystal cell includes a front surface that is a surface on an observer side and a back surface opposed to the front surface,
the first optical sheet is disposed on a front surface side of the first liquid crystal cell and the second optical sheet is disposed on a back surface side of the second liquid crystal cell, or the first optical sheet is disposed on the back surface side of the first liquid crystal cell and the second optical sheet is disposed on the front surface side of the second liquid crystal cell,
the first liquid crystal cell includes a first TFT substrate including a pixel electrode and a common electrode that are opposed to each other, a first counter substrate opposed to the first TFT substrate, the first counter substrate including a color filter and a black matrix surrounding the color filter, and a first liquid crystal layer disposed between the first TFT substrate and the first counter substrate,
the second liquid crystal cell includes a second TFT substrate including a pixel electrode and a common electrode that are opposed to each other, a second counter substrate opposed to the second TFT substrate, the second counter substrate including a black matrix, and a second liquid crystal layer disposed between the second TFT substrate and the second counter substrate,
the first liquid crystal layer includes positive type liquid crystal having positive dielectric anisotropy, and
the second liquid crystal layer includes negative type liquid crystal having negative dielectric anisotropy.

2. The liquid crystal display device according to claim 1, wherein the first optical sheet is disposed on the back surface side of the first liquid crystal cell and the second optical sheet is disposed on the front surface side of the second liquid crystal cell.

3. The liquid crystal display device according to claim 1, wherein the optical sheet further includes a light diffusion layer laminated on the polarizing plate and the retardation plate.

4. The liquid crystal display device according to claim 1, wherein an absorption axis of the polarizing plate and a slow axis of the retardation plate are substantially orthogonal to each other in the optical sheet.

5. The liquid crystal display device according to claim 2, further comprising a third optical sheet and a fourth optical sheet each of which is an optical sheet in which a polarizing plate and a light diffusion layer are laminated, the third optical sheet and the fourth optical sheet being an identical layer structure,
wherein the third optical sheet is disposed on the front surface side of the first liquid crystal cell and the fourth optical sheet is disposed on the back surface side of the second liquid crystal cell.

6. The liquid crystal display device according to claim 1, wherein
the first counter substrate of the first liquid crystal cell is disposed closer to the front surface of the first liquid crystal cell than the first TFT substrate, and
the second counter substrate of the second liquid crystal cell is disposed closer to the back surface of the second liquid crystal cell than the second TFT substrate.

7. The liquid crystal display device according to claim 1, wherein
a first display panel including the first liquid crystal cell and the first optical sheet displays a color image, and
a second display panel including the second liquid crystal cell and the second optical sheet displays a monochrome image.

8. The liquid crystal display device according to claim 1, wherein
the absorption axis of the polarizing plate and the slow axis of the retardation plate are substantially orthogonal to each other in the optical sheet,
a plurality of slits are formed in the pixel electrode of the first TFT substrate, the plurality of slits extending in a direction in which an angle formed between the pixel electrode of the first TFT substrate and the slow axis of the retardation plate of the first optical sheet is smaller than an angle formed between the pixel electrode of the first TFT substrate and the absorption axis of the polarizing plate of the first optical sheet, and
a plurality of slits are formed in the pixel electrode of the second TFT substrate, the plurality of slits extending in a direction in which an angle formed between the pixel electrode of the second TFT substrate and the slow axis of the retardation plate of the second optical sheet is larger than an angle formed between the pixel electrode of the second TFT substrate and the absorption axis of the polarizing plate of the second optical sheet.

* * * * *